(12) United States Patent
Hsu et al.

(10) Patent No.: US 12,123,728 B2
(45) Date of Patent: Oct. 22, 2024

(54) SERVICE DISRUPTION PREVENTION THROUGH DYNAMIC GEOFENCES

(71) Applicant: GM Cruise Holdings LLC, San Francisco, CA (US)

(72) Inventors: Jaimin Liang-Yan Hsu, Oakland, CA (US); Charles Bruce Matlack, San Francisco, CA (US); Sarah M. Rizk, San Francisco, CA (US); Rahul Narula, San Francisco, CA (US); Chung Ngan Ho, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 273 days.

(21) Appl. No.: 17/854,811

(22) Filed: Jun. 30, 2022

(65) Prior Publication Data

US 2024/0003695 A1    Jan. 4, 2024

(51) Int. Cl.
*G01C 21/34* (2006.01)
*H04W 4/021* (2018.01)

(52) U.S. Cl.
CPC ........ *G01C 21/3461* (2013.01); *H04W 4/022* (2013.01)

(58) Field of Classification Search
CPC .................................................. B60W 60/001
See application file for complete search history.

(56) References Cited

U.S. PATENT DOCUMENTS

| 11,037,450 | B2 * | 6/2021 | Ren ........................ H04W 4/021 |
| 2022/0196430 | A1 * | 6/2022 | Matsumoto ........ G01C 21/3415 |
| 2023/0331257 | A1 * | 10/2023 | Paxton ................ B60W 50/029 |
| 2024/0001954 | A1 * | 1/2024 | Hsu ........................ G08G 1/0133 |
| 2024/0003695 | A1 * | 1/2024 | Hsu ........................ H04W 4/021 |

* cited by examiner

*Primary Examiner* — Michael A Berns

(57) ABSTRACT

Service disruption prevention through monitoring dynamic geofencing is disclosed. The present disclosure seeks to prevent (or drastically reduce the probability) mass vehicle recovery events due to fragile portions of the map. Tooling is used to actively monitor chokepoints and new avoidance areas. Comprised by the operational design domain (ODD), geofences are actively changed in response to the state of the chokepoints and avoidance areas. Varying states can be assigned to a plurality of geofences within the ODD, for example, if a geofence reaches a critical state, one or more areas can be cut off from the ODD.

17 Claims, 12 Drawing Sheets

SERVICE DISRUPTION PREVENTION THROUGH DYNAMIC GEOFENCES

FIELD OF THE DISCLOSURE

The present disclosure relates generally to adjusting service area coverage for autonomous vehicles. More specifically, the present disclosure pertains to preventing service disruption through dynamic geofencing found in autonomous vehicle serviceable road networks.

BACKGROUND

Vehicles have been a major mode of transportation within many societies. In addition to carrying passengers, vehicles have become a means for transporting items and delivering items. As ridesharing companies and ride-hailing companies have grown and expanded services, passenger vehicles have become a common means for delivery of items. In particular, autonomous vehicles (AVs), which can drive themselves using a variety of sensors and in-vehicle technologies, and in which there is typically no human operator who drives or otherwise controls the vehicle, may also be used to autonomously deliver items such as groceries and food to recipients.

An AV is a vehicle that is configured to navigate roadways based upon sensor signals output by sensors of the AV, wherein the autonomous vehicle navigates the roadways without input from a human. The autonomous vehicle is configured to identify and track objects (such as vehicles, pedestrians, bicyclists, static objects, and so forth) based upon the sensor signals output by the sensors of the autonomous vehicle and perform driving maneuvers (such as accelerating, decelerating, turning, stopping, etc.) based upon the identified and tracked objects.

The use of automation in the driving of road vehicles, such as cars, trucks, and others, has increased as a result of advances in sensing technologies (e.g., object detection and location tracking), control algorithms, and data infrastructures. By combining various enabling technologies like adaptive cruise control (ACC), lane keeping assistance (LKA), electronic power assist steering (EPAS), adaptive front steering, parking assistance, anti-lock braking (ABS), traction control, electronic stability control (ESC), blind spot detection, GPS and map databases, vehicle to vehicle communication, and other, it becomes possible to operate a vehicle autonomously (i.e., with little or no intervention by a driver).

Fleets of AVs can provide various travel services, such as passenger transport and delivery transport. The AVs carry out such services by autonomously driving along a network of interconnected roads. The AVs may not be able to travel on certain roads, e.g., if a road is temporarily closed, or if the road is unsuitable for the AV to travel on due to low visibility, poor condition, high-pedestrian activity, or other factors. Furthermore, the AVs may only be able to stop along certain roads or at certain locations, e.g., an AV can only stop along a road if there is a suitable stopping lane or parking space.

Maps can be fragile due to several factors including the shape of the operational design domain (ODD), AV limitations, safety concerns, and temporary events. In an environment where our AVs are serving customers, it is important to protect customers from fragile parts of the serviceable road network because there is a probability that large portions of the serviceable road network will become unavailable, which may require physical retrieval of the AV. If this happens, it will generate negative public perception and require significant operational coordination to resolve.

Features and advantages of the present invention will be presented in the description which follows, and in part will become apparent from the description and the accompanying drawings or may be learned by practice of the invention according to the teachings provided in the description. Objects as well as other features and advantages of the present invention will be realized and attained by an impact simulator particularly pointed out in the Specification in such full, clear, concise, and exact terms as to enable a person having ordinary skill in the art to practice the invention.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY

Service disruption prevention through monitoring dynamic geofencing is disclosed. The present disclosure seeks to prevent (or drastically reduce the probability) mass vehicle recovery events due to fragile portions of the serviceable road network. Tooling is used to actively monitor chokepoints and new avoidance areas. Comprised by the ODD, geofences are actively changed in response to the state of the chokepoints and avoidance areas. Varying states can be assigned to a plurality of geofences within the ODD, for example, if a geofence reaches a critical state, one or more areas can be cut off from the ODD.

According to one aspect of the present disclosure, a method for preventing service disruptions in an autonomous vehicle fleet comprises identifying avoidance areas, populating an avoidance area group with the identified avoidance areas, defining an operational design domain by excluding the avoidance areas in the avoidance area group, at least in part, creating a first geofence comprised by the operational design domain, monitoring the avoidance area group for changes, and dynamically moving the first geofence based at least on a monitored change.

According to one or more aspects of the present disclosure, the method further comprises monitoring the choke point.

According to one or more aspects of the present disclosure, the monitoring includes creating a polygon at the choke point.

According to one or more aspects of the present disclosure, software tooling is used to perform the monitoring.

According to one or more aspects of the present disclosure, the polygon is highly granular.

According to one or more aspects of the present disclosure, the method further comprises monitoring the highly granular polygon at a substantially real-time rate.

According to one or more aspects of the present disclosure, the change includes a new avoidance area.

According to one or more aspects of the present disclosure, the monitored change in dynamic movement of the first geofence includes excluding the avoidance area from the first geofence.

According to one or more aspects of the present disclosure, the monitored change dynamic movement of the first geofence includes excluding the avoidance area from the operational design domain.

According to one or more aspects of the present disclosure, the change removes an avoidance area already present in the avoidance area group.

According to one or more aspects of the present disclosure, the already dynamic movement of the first geofence includes augmenting the first geofence to include the removed avoidance area.

According to one or more aspects of the present disclosure, the already dynamic movement of the first geofence includes augmenting the operational design domain to include the removed avoidance area.

According to one or more aspects of the present disclosure, the method further comprises calculating a fragility to an area of the operational design domain based at least on the connectivity.

According to one or more aspects of the present disclosure, the method further comprises removing a cut off area of the operational design domain based at least on the calculated fragility.

According to one or more aspects of the present disclosure, the method further comprises instructing on or more autonomous vehicles present in a cut off area of the operational design domain to self-evict.

According to one or more aspects of the present disclosure, the method further comprises a second geofence which is comprised by the operational design domain.

According to one or more aspects of the present disclosure, the first and second geofences have different assigned states.

According to one aspect of the present disclosure, a system for preventing service disruption in a fleet of autonomous vehicles comprises a monitoring circuit configured to detect changes in at least one of avoidance areas in an avoidance area group, operational design domain, and a vehicle router configured to reconfigure one or more geofences based at least on changes detected by the monitoring circuit, wherein the operational design domain comprises the one or more geofences and excludes the avoidance areas in an avoidance area group.

According to one or more aspects of the present disclosure, the system further comprises a simulator using visual analysis.

According to one aspect of the present disclosure, a method for preventing service disruption in an operation design domain comprises identifying a choke point in the operational design domain, monitoring the choke point for changes, and dynamically move a geofence based on the choke point changes, wherein the operational design domain comprised the geofence.

The drawings show exemplary impact emulations and configurations. Variations of these circuits, for example, changing the positions of, adding, or removing certain elements from the circuits are not beyond the scope of the present invention. The illustrated circuits, configurations, and complementary devices are intended to be complementary to the support found in the detailed description.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

For a fuller understanding of the nature and advantages of the present invention, reference is made to the following detailed description of preferred embodiments and in connection with the accompanying drawings, in which.

DETAILED DESCRIPTION

Overview

Figure 1:
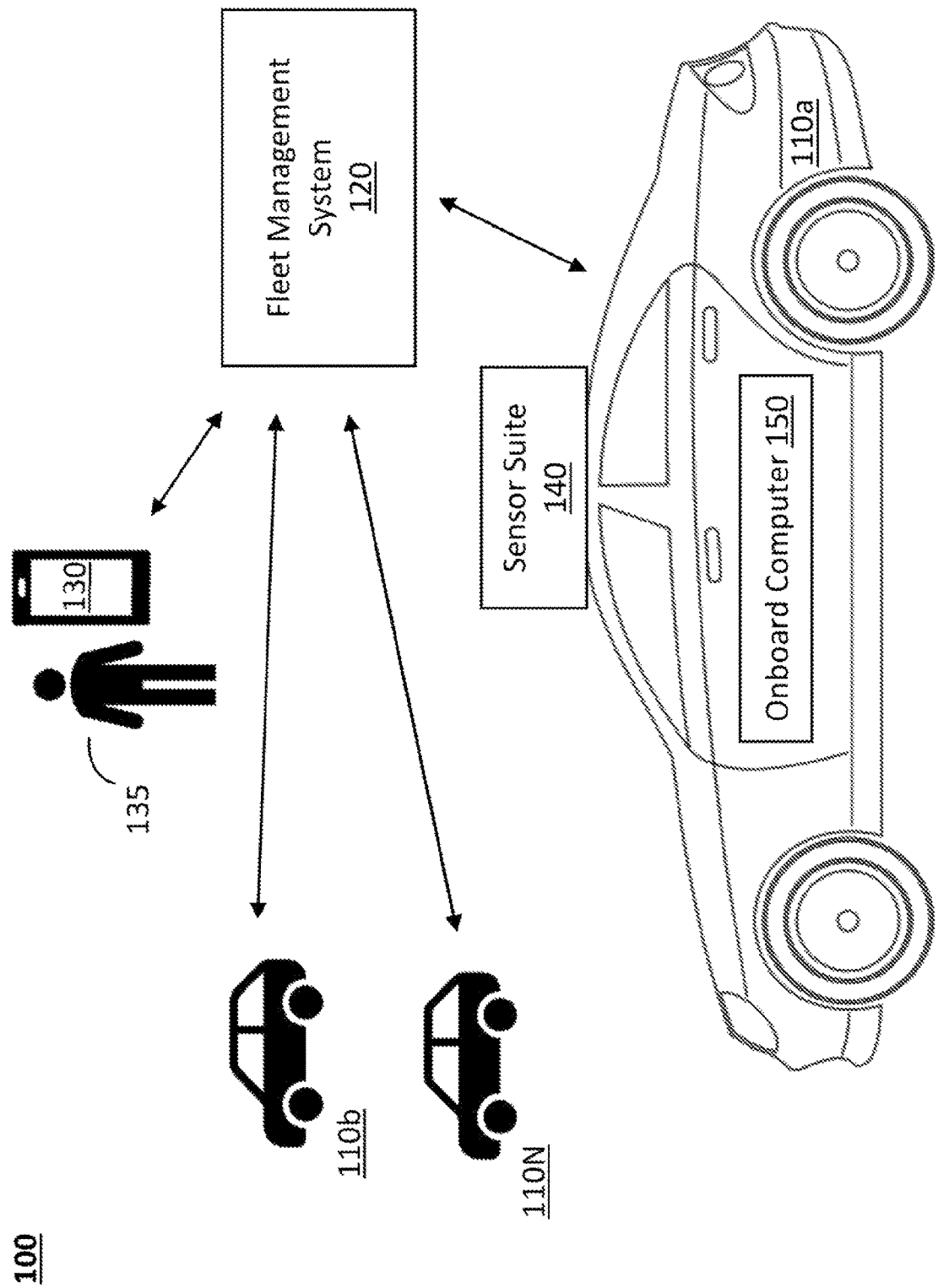
FIG. 1 is a block diagram illustrating a system including an example AV fleet and fleet management system for determining service coverage according to some embodiments of the present disclosure.

The present disclosure relates generally to adjusting service area coverage for autonomous vehicles. More specifically, the present disclosure pertains to preventing service disruption through dynamic geofencing found in autonomous vehicle serviceable road networks. The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

Service disruption prevention through choke point identification, monitoring and dynamic geofencing is disclosed. The present disclosure seeks to prevent (or drastically reduce the probability) mass vehicle recovery events due to fragile portions of the serviceable road network. Choke points are identified by iterating through the lanes of a serviceable road network and analyzing the effect of their removal on the ODD. Once identified, chokepoints can be added to an avoidance area. Down and upstream effects also can be determined. Based on the monitoring of lanes and/or areas, location connectivity can be estimated and a serviceable road network fragility calculated therefrom. If too many choke points are blocked (not traversable), one or more areas can be disconnected from the serviceable road network.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

AVs travel between locations on networks of roads. The road network may include public roads (e.g., city streets, highways, etc.) and private roads (e.g., driveways, parking lots, and other roads on private property). AVs rely on a map describing the road network to navigate the road network. The map includes a high level of detail, including the geographic parameters of roads, connections between roads, the locations of various features in the road (e.g., the positions of different lanes, speed bumps, medians or other on-road barriers, rumble strips, etc.), pedestrian crossings, traffic signs, stop lights, and various other features near roads (e.g., fire hydrants, bus stops, trash cans, etc.).

As noted above, various factors can cause AVs to avoid certain portions of the road network. These factors may include issues with a road itself, such as a road closure or a road with low visibility. As another example, AVs avoid a road when a real-world change from the map data describing the road has been identified (e.g., a change has been flagged by another AV in the fleet), but the change has not yet been incorporated into the map data, e.g., when a new stop sign or speed bump has been observed, but the feature is not reflected in the map data. As another example, the AV may avoid a road due to AV software limitations, e.g., if the AVs are not trained to navigate a certain type of roadway or intersection, or if previous AVs have had difficulty navigating on a particular road due to a software bug. Areas that AVs avoid traversing (e.g., driving to or driving through) are referred to as avoidance areas, and these avoidance areas are labeled in the map data.

In some implementations, AVs may not drive on avoidance areas at all, e.g., routing software prohibits AVs from traversing avoidance areas. In other embodiments, AVs may at times traverse avoidance areas, or may traverse some subset of avoidance areas, but a routing software used by an AV prefers routes that avoid the avoidance areas when possible. For example, a routing software may weight the avoidance areas to cause AVs to tend to navigate around them, unless they are highly preferred (e.g., if reaching a destination address requires traversing an avoidance area, or if routing around an avoidance area adds a considerable distance or travel time to a route).

Avoidance areas can impact the quality of a service or services provided by the AV fleet. For example, if the AV fleet is used to provide rides to users or make deliveries to users, avoidance areas can impact whether an AV can reach a particular location, or how long it takes an AV to reach a particular location. Different avoidance areas can have different degrees of impact, e.g., depending on where an avoidance area fits into a road network, or the demand for services near an avoidance area. For example, if one lane of a low-traffic two-way street is marked as an avoidance area (e.g., due to a recent change in traffic pattern to turn onto the avoided lane), but the AV can still drive down another lane traveling in the opposite direction, the impact on a delivery user requesting a delivery to an address along the avoidance lane may be low, since the user can simply cross the street to reach the AV. On the other hand, if another avoidance area prevents an AV from driving down a one-way street, AVs cannot reach any addresses along this street, the user requesting delivery along the one-way street would have a longer walk to reach the AV on a nearby street.

Avoidance areas can be restored to a routable map so that AVs can travel through the avoidance areas. Restoring an avoidance area may allow the routing software to route an AV to traverse the avoidance area (if the avoidance area was prohibited), or may remove a weighting or reduced preference (if the avoidance area was less preferred by the routing software). Depending on the type of avoidance area, different personnel associated with a map provider or fleet management system may have to make changes to the map database and/or to AV software to restore a particular avoidance area. For example, a map manager may manually update a map database to reflect real-world changes to a roadway, and after the map database is updated, the map manager restores the avoidance area to the map. Other serviceable road network updates may be partially automated, but the avoidance area is not restored until human reviews the serviceable road network update. As another example, a software engineer may make changes to the AV software to address a software bug or limitation that prevented an AV from routing through an avoidance area or set of related avoidance areas.

Given limited resources for updating serviceable road networks and/or AV software, it can be challenging for the serviceable road network providers or software engineers to determine which avoidance areas to address first. A naïve approach may address the oldest avoidance areas first. However, resources can be better utilized by addressing the most impactful avoidance areas, e.g., avoidance areas that affect the widest area, or avoidance areas that impact the most users.

As described herein, a mapping system can determine impacts of restoring avoidance areas to a routable serviceable road network. The mapping system may be an AV fleet management system that maintains serviceable road network data used by the AV fleet. The mapping system stores a serviceable road network database that includes data describing avoidance areas. For a given avoidance area, the mapping system determines an area that can be accessed by the AV if the AV traverses the avoidance area. For example, the mapping system may determine a first routable lane graph based on roadways that the AV can route to given the current state of the serviceable road network (including avoidance areas), and a second routable lane graph based on roadways that the AV can route to if the avoidance area is restored. The mapping system may determine a first coverage area for the first routable lane graph, e.g., by generating and combining buffers corresponding to the first routable lane graph. The mapping system may determine a second coverage area for the second routable lane graph in a similar manner. The mapping system identifies a portion of the second coverage area that is not in the first coverage as a restored coverage area, i.e., a coverage area that is gained by restoring the avoidance area to the serviceable road network. If an avoidance area is not prohibited but instead merely less preferred (e.g., weighted to reduce likelihood that AVs traverse the avoidance area), the mapping system may determine the first routable lane graph as though the avoidance area were prohibited, and determine the second routable lane graph as though the avoidance area were not prohibited.

The mapping system may determine a score for the avoidance area based on the restored coverage area. In one embodiment, the score is an area of the restored coverage area, so that avoidance areas that result in a larger restored coverage area have higher scores. In another embodiment, the score is based on a market weighting for the restored coverage area, e.g., a historical or projected demand for service in the restored coverage area. The mapping system can use the scores to compare different coverage areas, and the mapping system can identify or prioritize avoidance areas for restoration based on the scores.

In some cases, restoring a set of avoidance areas may have an outsized impact on routability, e.g., restoring two nearby or related avoidance areas may have a greater impact than a sum of the impact of restoring either avoidance area alone. To find such avoidance areas, the mapping system may identify a cluster of two or more avoidance areas, determine a restored coverage area if the cluster of avoidance areas are all restored, and determine a score based on the restored coverage area. A cluster of avoidance areas may be identified based on geographic proximity or network proximity (e.g., the number of maneuvers to reach one avoidance area from another avoidance area). As another example, a cluster of avoidance areas may be associated with a common software update, e.g., a set of avoidance areas that are all related to a single software limitation or bug.

Embodiments of the present disclosure provide a method for determining and displaying a coverage area, and a computer-readable medium for performing the method. The method includes identifying an avoidance area in a serviceable road network database, the serviceable road network database storing data describing a set of connected roads each having one or more lanes, and the avoidance area comprising an area in the serviceable road network database that an AV avoids traversing; determining at least one lane that can be accessed by the AV if the AV traverses the avoidance area; generating a restored coverage area corresponding to the at least one lane, the restored coverage area corresponding to an area of restored coverage provided by the AV traversing the avoidance area; and computing a score based on the restored coverage area, the score indicating an impact of restoring access by the AV to the avoidance area.

Embodiments of the present disclosure provide a system having a serviceable road network database and computer circuitry. The serviceable road network database stores data describing a set of connected roads each having one or more lanes, and the avoidance area comprising an area in the serviceable road network database that an AV avoids traversing. The computer circuitry is to identify an avoidance area in the serviceable road network database; determine at least one lane that can be accessed by the AV if the AV traverses the avoidance area; generate a restored coverage area corresponding to the at least one lane, the restored coverage area corresponding to an area of restored coverage provided by the AV traversing the avoidance area; and compute a score based on the restored coverage area, the score indicating an impact of restoring access by the AV to the avoidance area.

As will be appreciated by one skilled in the art, aspects of the present disclosure, in particular aspects of generating and displaying service coverage areas for AVs, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

The inventors of the present disclosure have identified numerous shortcomings found in the state of the art. Specifically, serviceable road networks which are too fragile can produce undesirable scenarios for a user and operator, such as vehicle recovery events (VRE). The inventors of the present disclosure have recognized the long felt need for a more robust identification of choke points and monitoring thereof, to overcome the deficiencies of the state of the art, at least in part.

Example AV System for Determining Choke Points

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

FIG. 1 is a block diagram illustrating a system 100 including an example AV fleet and fleet management system for determining service coverage according to some embodiments of the present disclosure. The system 100 includes a fleet of AVs 110, including AV 110a, AV 110b, and AV 110N, a fleet management system 120, and a user device 130. For example, a fleet of AVs may include a number N of AVs, e.g., AV 110a through AV 110N. AV 110a includes a sensor suite 140 and an on-board computer 150. AVs 110b through 110N also include the sensor suite 140 and on-board computer 150. A single AV in the fleet is referred to herein as AV 110, and the fleet of AVs is referred to collectively as AVs 110.

The fleet management system 120 receives service requests for the AVs 110 from user devices, such as user device 130. For example, the user 135 accesses an app executing on the user device 130 and, using the app, enters a ride request including a pick-up location and a drop-off location. The fleet management system 120 dispatches AVs 110 to carry out the service requests. The fleet management system 120 also maintains a serviceable road network database. When an AV 110 is dispatched for a service request, the fleet management system 120 and/or the AV 110 determines a route for the AV 110 to follow based on the data in the serviceable road network database, including locations at which the AV 110 can stop for user interactions, such as a user entering or exiting the AV 110, or loading or unloading items from the AV 110. For example, the fleet management system 120 or AV 110 determines a particular location where the AV 110 can stop to pick up or drop off a passenger, or where the AV 110 can stop so that a user can access the AV 110 to collect a delivery item.

The AV 110 is preferably a fully autonomous automobile, but may additionally or alternatively be any semi-autonomous or fully autonomous vehicle; e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radio detecting and ranging (RADAR), sonar, light detecting and ranging (LIDAR), GPS, wheel speed sensors, inertial measurement units (IMUs), accelerometers, microphones, strain gauges, pressure monitors, barometers, thermometers, altimeters, etc. The sensors may be located in various positions in and around the AV 110.

An on-board computer 150 is connected to the sensor suite 140 and functions to control the AV 110 and to process sensed data from the sensor suite 140 and/or other sensors in order to determine the state of the AV 110. Based upon the vehicle state and programmed instructions, the on-board computer 150 modifies or controls behavior of the AV 110. For example, the on-board computer 150 maneuvers the AV 110 according to routing selections determined by an on-board or remote navigation system. The on-board computer 150 also collects data describing roads on which the AV 110 travels or in the vicinity of the AV 110 and transmits the collected data to the fleet management system 120, which may incorporate the collected data into the serviceable road network database.

The on-board computer 150 is preferably a general-purpose computer adapted for I/O communication with vehicle control systems and sensor suite 140, but may additionally or alternatively be any suitable computing device. The on-board computer 150 is preferably connected to the Internet via a wireless connection (e.g., via a cellular data connection). Additionally, or alternatively, the on-board computer 150 may be coupled to any number of wireless or wired communication systems.

The fleet management system 120 manages the fleet of AVs 110. The fleet management system 120 may manage a service that provides or uses the AVs 110, e.g., a service for providing rides to users with the AVs 110, or a service that delivers items, such as prepared foods, groceries, or packages, using the AVs 110. The fleet management system 120 may select an AV from the fleet of AVs 110 to perform a particular service or other task, and instruct the selected AV (e.g., AV 110a) to autonomously drive to a particular location (e.g., a pick-up address or a delivery address). If the AV 110 cannot drive directly to a particular address or location, or cannot stop at the location, the fleet management system 120 may select a nearby location where the AV 110 can drive to and stop. The fleet management system 120 may select a route for the AV 110 to follow. The fleet management system 120 also manages fleet maintenance tasks, such as charging and servicing the AVs 110.

As shown in FIG. 1, each of the AVs 110 communicates with the fleet management system 120. The AVs 110 and fleet management system 120 may connect over a public network, such as the Internet. The fleet management system 120 is described further in relation to FIG. 2.

The user device 130 is a personal device of the user 135, e.g., a smartphone, tablet, computer, or other device for interfacing with a user of the fleet management system 120. The user device 130 may provide one or more applications (e.g., mobile device apps or browser-based apps) with which the user 135 can interface with a service that provides or uses AVs. The service, and the AVs 110 associated with the service, are managed by the fleet management system 120, which may also provide the application to the user device 130. In other embodiments, the service is managed by a separate system (e.g., a food delivery service) that relies on the AV fleet for some or all of its transportation tasks and interacts with the fleet management system 120 to arrange transportation tasks. An application provided by the fleet management system 120 may provide various user interfaces to the user 135. In particular, the application may display coverage maps determined by the coverage system of the fleet management system 120, described below. In other examples, the coverage maps and/or other coverage information may be provided from the fleet management system 120 to a second service provider, which may provide coverage maps and/or coverage information to the user devices 130 through a separate application.

Example Fleet Management System

Figure 2:
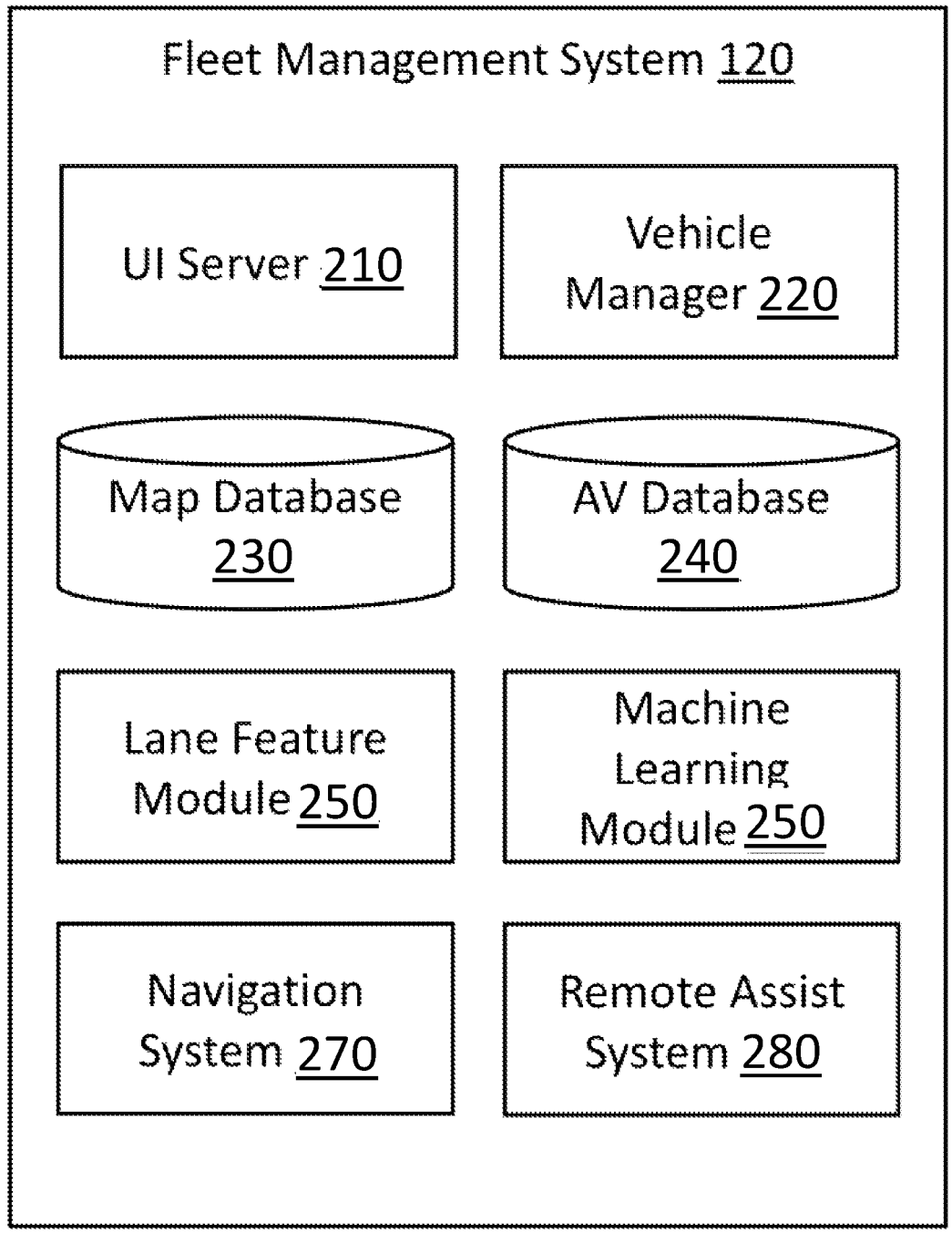
FIG. 2 is a block diagram illustrating a fleet management system according to some embodiments of the present disclosure.

FIG. 2 is a block diagram illustrating the fleet management system 120 according to some embodiments of the present disclosure. The fleet management system 120 includes a UI (user interface) server 210, a vehicle manager 220, a map database 230, an AV database 240, a lane feature module 250, a machine learning module 260, a navigation system 270, and a remote assist system 280. In alternative configurations, different and/or additional components may be included in the fleet management system 120. Further, functionality attributed to one component of the fleet management system 120 may be accomplished by a different component included in the fleet management system 120 or a different system than those illustrated. For example, in some embodiments, some or all of the functionality of the navigation system 270 is performed by the AV 110, e.g., by the on-board computer 150. Furthermore, a portion of the data of the map database 230 and/or the AV database 240 (e.g., map data describing an area around a current location of the AV 110) may be stored on the AV 110 for access by a navigation system 270 local to the AV 110.

The UI server 210 is configured to communicate with client devices that provide a user interface to users. For example, the UI server 210 may be a web server that provides a browser-based application to client devices, or the UI server 210 may be a mobile app server that interfaces with a mobile app installed on client devices. The user interface enables the user to access a service of the fleet management system 120, e.g., to request a ride from an AV 110, or to request a delivery from an AV 110.

The vehicle manager 220 manages and communicates with a fleet of AVs, including AVs 110a through 110N. The UI server 210 transmits service requests received from users to the vehicle manager 220, and the vehicle manager 220 assigns AVs 110 to the service requests. More broadly, the vehicle manager 220 directs the movements of the AVs 110 in the fleet. For example, the vehicle manager 220 may instruct AVs 110 to drive to other locations while not servicing a user, e.g., to improve geographic distribution of the fleet, to anticipate demand at particular locations, to drive to a charging station for charging, etc. The vehicle manager 220 also instructs AVs 110 to return to AV facilities for recharging, maintenance, or storage. The vehicle manager 220 may interface with the navigation system 270, which selects a route for an AV 110 to follow.

In an embodiment, the UI server 210 receives a service request from a user, such as a request for a ride. The vehicle manager 220 selects an AV 110 of the fleet to carry out the service request. The vehicle manager 220 transmits the origin location (e.g., starting point of the AV 110), destination location (e.g., drop-off location), and any waypoints (e.g., location to pick up the user) to the navigation system 270. The navigation system 270 determines a route for the AV 110 using lane-level data, as described below, and provides the route to the vehicle manager 220. The vehicle manager 220 transmits the selected route to the AV 110. The vehicle manager 220 may receive updates about the location of the AV 110 and provide the updates to the navigation system 270. The navigation system 270 may periodically recalculate a route for the AV 110, e.g., based on changing traffic conditions, which the vehicle manager 220 transmits to the AV 110.

The map database 230 stores data describing a set of connected roadways. Each of the roadways has one or more lanes. The map database 230 may store some data at the roadway level, such as data describing geographic location of the road, connections to other roadways, speed data (e.g., speed limit), and traffic flow direction. The map database 230 also stores lane-level parameters that describe individual lanes. For example, lane-level parameters include data describing the position of a given lane relative to other lanes and roadways, e.g., whether the lane is a single-lane road, or the position of the lane relative to other lanes of a multi-lane road. Lane-level parameters include types of permitted maneuver for the lane, e.g., whether a lane crossing an intersection is a right-turn lane, left-turn lane, straight lane, or has multiple permitted maneuvers, or whether or not a vehicle is permitted to change to a neighboring lane. The lane-level parameters may include attributes describing the environment of a given lane, such as attributes describing any visual obstructions associated with the lane (e.g., trees, statues, buildings, or fences that obstruct the view of oncoming traffic) or physical obstructions (e.g., downed trees, construction, large potholes). Obstruction-related parameters may include the size of the obstruction, the location of or distance to the obstruction, and what is blocked by the obstruction (e.g., oncoming traffic, a traffic light, a stop sign). Additional lane-level parameters may include measurements of geometric features of the lane, such as width of a lane at various points or along a spans (e.g., average and/or minimum width for the lane along each city block), curvature (e.g., maximum or average curvature around a turn), or grade (e.g., maximum and/or average grade of the lane along a city block). Further lane-level parameters may include measurements of lane use, such as statistics describing traffic levels or traffic speeds at different times of day, and data describing the frequency of vehicles moving into or out of the lane (e.g., from neighboring lanes, from intersecting streets, or from driveways). The lane-level parameters may also include parameters describing the performance of AVs along a lane, such as takeover rates, collision rates, or comfort levels.

The AV database 240 stores historical driving data collected from the fleet of AVs 110. The fleet of AVs 110 may collect data while driving, including images, point clouds, speed records, traffic data, takeover data, collision data, IMU data, and other types of data, which the AVs 110 transmit to the fleet management system 120 for storage in the AV database 240. At least a portion of the data stored in the AV database 240 is referenced to a particular lane in which the AV 110 that collected the data traveled. The historical driving data includes performance-related events. For example, the AV database 240 stores data describing takeover events on a given lane; a takeover event occurs when a safety driver riding in the AV 110 asserts manual control over the AV 110. As another example, the AV database 240 stores, for a given lane, collision data describing any collisions of AVs 110 traveling on the lane, including whether a collision occurred, other vehicles or objects involved in the collision, and collision severity. As a further example, the AV database 240 stores data describing comfort levels of vehicle passengers on trips down a given lane. The comfort level of a lane may be obtained by polling riders traveling down the lane, or inferred from ride data gathered by the AVs 110, e.g., data describing sudden accelerations or decelerations (e.g., as measured by IMU in the sensor suite 140, or based on acceleration and braking data), data describing sudden turns or swerves (e.g., as measured by the IMU, or based on steering data), or data describing the lane surface (e.g., as measured by the IMU, or based on roadway data, such as known locations of potholes or speed bumps).

The lane feature module 250 processes data stored in the AV database 240 to generate at least some of the lane-level parameters stored in the map database 230. For example, the lane feature module 250 calculates lane-level parameters describing performance of AVs 110 based on the data collected from the AV fleet 110 and stored in the AV database 240. For example, a number of takeovers may be divided by a total number of trips of AVs 110 down the lane to calculate a takeover rate for a lane. As another example, the comfort level data is processed to determine one or more lane-level comfort parameters, such as ride smoothness. The lane feature module 250 may obtain data from additional sources, including third party data sources, to calculate some lane-level performance parameters. For example, the lane feature module 250 may obtain collision data from one or more insurance companies and process this data, optionally in combination with collision data collected by AVs 110, to determine a collision rate for the lane.

The lane feature module 250 may determine or update other lane-level parameters based on data in the AV database 240 and/or other data sources. For example, the lane feature module 250 retrieves current construction information and loads the construction information into the map database 230. As another example, the lane feature module 250 derives certain lane-level parameters from other data sets. For example, lane-level geometric data may be calculated from a map data set that describes boundaries of individual lanes, the boundaries having been drawn automatically (e.g., using a model for processing satellite imagery) or manually.

The machine learning module 260 develops a model to predict performance of a lane. The machine learning module 260 may apply supervised or unsupervised learning processes to the stored lane-level parameters in the map database 230 along with historical driving data stored in the AV database 240 to generate a predictive model. The machine learning algorithm may determine sets of one or more lane parameters that describe lane groups. In one embodiment, the machine learning module 260 generates a decision tree that groups lanes by one or more lane-level parameters based on the historical driving data. In another embodiment, the machine learning module 260 performs a clustering algorithm to generate lane groupings based on the stored lane-level parameters along with historical driving data. In other embodiments, rather than generating lane groups, the machine learning module 260 generates an artificial neural network or another type of model to predict performance based on lane-level parameters.

In the embodiments that generate lane groups (e.g., decision tree or clustering algorithms), the lanes that make up a lane group are associated with similar levels of performance, as measured by the historical driving data, relative to lanes of at least one other lane group described by a different set of parameters. For example, the machine learning algorithm may determine, as one group, inner left-turn lanes with a turn angle above 120°, and as another group, outer left-turn lanes with a turn angle above 120°. The machine learning algorithm may determine to separate the two types of dual-left-turn lanes with a turn angle above 120° based on the historical data showing that, across many observations, inner left-turn lanes with a turn angle above 120° have a different performance rate from outer left-turn lanes with a turn angle above 120°. The machine learning module 260 may calculate performance metrics across lanes included in each group. For example, the machine learning module 260 combines all observations across the lanes in a particular group to determine a takeover rate for that group (e.g., a takeover rate for inner left-turn lanes with a turn angle above 120°).

The machine learning module 260 may consider any of the parameters described with respect to the map database 230 in determining the groups. Different groups may be described by different numbers of parameters. In addition, the machine learning module 260 may consider the parameters of adjacent lanes in determining the groups. For example, in processing lane parameters to determine groups, the machine learning module 260 retrieves from the map database 230 data describing each lane's adjacent lanes, optionally including any bicycle lanes, bus lanes, sidewalks, etc., and parameters describing the adjacent lanes. The machine learning module 260 may determine groups based on the parameters of adjacent lanes, such as lane type (e.g., car, bus, pedestrian, or bicycle), lane width, flow direction, and flow rate. For example, one group may be single-lane roads adjacent to a bidirectional bicycle lane with an average flow rate of 3 bicycles/minute.

The navigation system 270 determines a route for the AV 110 based at least in part on lane-level data in the map database 230. In some embodiments, the navigation system 270 uses existing routing algorithms to determine one or more candidate routes along a set of roadways for the AV 110 to travel that optimizes one or more objectives, e.g., time or distance, and selects between different lanes on a route or different candidate routes based on lane-level information. In some embodiments, the navigation system 270 incorporates predicted lane performance when generating candidate routes and calculating routing costs for candidate routes. For example, the lane performance may be included as one factor in an overall route cost that includes other performance factors, such as time, distance, fuel usage, roadway performance, vehicle wear, and/or other factors, and the navigation system 270 selects a route that minimizes the overall route cost. The navigation system 270 may factor in the cost of changing lanes when selecting a route. For example, the navigation system 270 factors in an expected time to change lane (e.g., if the AV 110 slows down when changing lanes), or a difficulty in making a given lane change (e.g., the navigation system 270 avoids crossing multiple lanes in a short distance, or includes a cost for a difficult lane change). Several simplified examples of selecting candidate lanes are described below. It should be understood that the navigation system 270 may incorporate lane-level information at various points in the routing process, e.g., when identifying candidate routes, when selecting a candidate route, in real-time as the AV 110 is driving, and that the lane performance metrics may be one of many factors considered when routing the AV 110, and that the lane-level data may be considered in tandem with other factors, not all of which are outlined here.

In one example, the navigation system 270 identifies candidate lanes along the determined route, e.g., one roadway along the route has two adjacent lanes on which the AV 110 can travel (e.g., two lanes that travel straight, or two left-turn lanes), which are candidate lanes for the AV 110. The navigation system 270 retrieves one or more parameters describing each of the candidate lanes from the map database 230. The navigation system 270 determines a performance metric for each of the candidate lanes based on the retrieved parameter(s) for the candidate lane. For example, the navigation system 270 retrieves a takeover rate metric from the map database 230, the takeover rate calculated by the lane feature module 250 based on data describing a number of recorded AV takeovers and number of trips down the lane by the AV fleet 110. As another example, the navigation system 270 determines a predicted takeover likelihood based on parameters describing the geometry of the lane and visual obstructions of the lane. The navigation system 270 may determine the predicted takeover likelihood based on takeover rates across a group of similar lanes, such as lanes with a similar geometry and similar visual obstructions, as determined by the machine learning module 260. Based on the performance metric, the navigation system 270 selects a candidate lane (e.g., one of the two left-turn lanes) for routing the AV 110.

In another example, the navigation system 270 identifies multiple candidate routes between an origin point and a destination point and selects a route for the AV 110 based on lane-level data associated with each of the candidate routes. For example, the navigation system 270 identifies a first route that includes an unprotected left-turn lane on a given street, and a second route that includes a different unprotected left-turn lane on a different street, e.g., a parallel street. The navigation system 270 compares performance metrics for the lanes included in the candidate routes and selects a route based on the lane-level performance metrics. For example, if the left-turn lane on the first route has a higher performance metric than the left-turn lane on the second route, the navigation system 270 selects the first route. The navigation system 270 may compare two routes by determining one or more composite scores for the routes and comparing the composite score(s). For example, the navigation system 270 calculates an average performance metric of the lanes along each route, finds a minimum lane performance metric along each route, or calculates other statistics summarizing performance across each route. The navigation system 270 may calculate composite performance metrics for portions of the route (e.g., a portion from the origin point to a first waypoint, or a portion from the origin point to a point common to multiple candidate routes), and select a route for that portion based on the composite performance metrics.

As discussed above, one example performance metric for a candidate lane is takeover likelihood, which is the likelihood that a safety driver in the AV asserts manual control over the AV while the AV travels along the candidate lane. In one embodiment, the takeover likelihood performance metric is an observed takeover rate on a lane that has a large number of observations (e.g., more than 1000) in the AV database 240. For example, the fleet of AVs 110 has collected 10,000 observations of a lane, by driving down the lane 10,000 times. If a safety driver manually took control 50 times, the observed takeover rate is 0.5%. In another embodiment, the takeover rate performance metric is based on observations across a group of lanes that have been grouped together by the machine learning module 260, as described above. For example, the navigation system 270 retrieves parameters of a given candidate lane indicating that the lane is 12 feet wide, has no curvature, and has an adjacent high-traffic bicycle lane. The navigation system 270 retrieves data describing takeover rate on a group of similar lanes identified by the machine learning module 260; for example, a fleet of AVs 110 traveling on the group of lanes has collected 25,000 observations across lanes in the group, of which safety drivers manually took control 25 times, for an observed takeover rate of 0.1%. Thus, based on this group data, the navigation system 270 predicts a takeover rate of 0.1% for the candidate lane.

Other performance metrics may be used in addition to or instead of takeover rate. Another example performance metric is a likelihood that the AV experiences a collision while traveling along the candidate lane. Other example performance metrics describe a comfort level of a passenger in the AV or others, such as pedestrians, bicyclists, and other drivers or passengers in other vehicles. As discussed above, the comfort level may be based on rider polling and/or based on one or more factors that contribute to rider comfort, such as sudden accelerations or decelerations, data describing sudden turns or swerves, or data describing the lane surface. In some embodiments, the navigation system 270 determines a composite performance metric based on multiple types of performance metrics, e.g., by multiplying the takeover rate and the collision rate.

In some embodiments, the performance metric may be determined for a given lane under a given condition or set of conditions. For example, a candidate lane may have one performance metric during daytime, and a different performance metric during nighttime, e.g., if performance drops due to lower visibility at night, or if performance increases due to less traffic at night. The condition information may be used to select observations in the AV database 240, e.g., if 40 of the 50 takeovers observed for the lane described above occurred at night, and 2000 of the observations were made at night, the navigation system 270 may determine a takeover rate of 2% based on the nighttime observations. Other condition information may include, for example, traffic conditions (e.g., expected rush hour traffic, or real-time traffic data), other visibility conditions (e.g., rain, fog, smoke, snow), and season (e.g., if foliage decreases visibility at an intersection).

In some embodiments, the navigation system 270 identifies a set of lanes that have a performance metric below a threshold and avoids these lanes if possible when determining a route. For example, the navigation system 270 permits a lane with a performance metric below the threshold to be included in the route if the lane cannot be avoided, e.g., the lane is at the origin or destination, or the route cannot be calculated without using the lane. The navigation system 270 may balance the performance metrics with other factors, such as speed, distance, costs (e.g., energy costs, avoiding tolls), or scenery. A user may provide input to the UI server 210 indicating routing preferences, e.g., preferring a more comfortable and scenic ride over a faster ride, or vice versa.

The remote assist system 280 is a system that allows a human to perform manual remote observation of the AV 110 and provide inputs to the AV 110. The fleet management system 120 provides the remote assist system 280 to enable an operator to observe the AV 110 when the AV encounters an unusual environment or situation and to assist the AV 110 as needed. The remote assist system 280 provides user interfaces displaying, for example, images collected by the sensor suite 140, other data collected by the sensor suite 140, and a map showing the location of the AV 110. The remote assist system 280 allows the operator to provide manual inputs to the AV 110, such as the identity of an object the AV 110 cannot identify or a current status of a traffic light or other dynamic signal.

In some embodiments, if the navigation system 270 determines that a lane on which the AV 110 is routed has a performance metric below a threshold, the remote assist system 280 is activated and displays an alert to an operator relating to the performance metric of the selected candidate lane. The alert may provide information about any roadway features that drive the low-performance rating, such as whether the AV 110 has low visibility on a lane, or if there is an adjacent high-traffic bicycle lane. The remote assist system 280 may be activated by the navigation system 270 that determined the route in response to determining that the AV 110 is approaching the lane with the low-performance score. Alternatively, the remote assist system 280 may be activated by the AV 110 in response to the AV 110 detecting that it is approaching a low-performance lane. In some embodiments, the remote assist system 280 may be activated based on certain parameters but not on others, e.g., the remote assist system 280 is activated based on visibility parameters, but not on road surface parameters.

Example On-Board Computer

Figure 3:
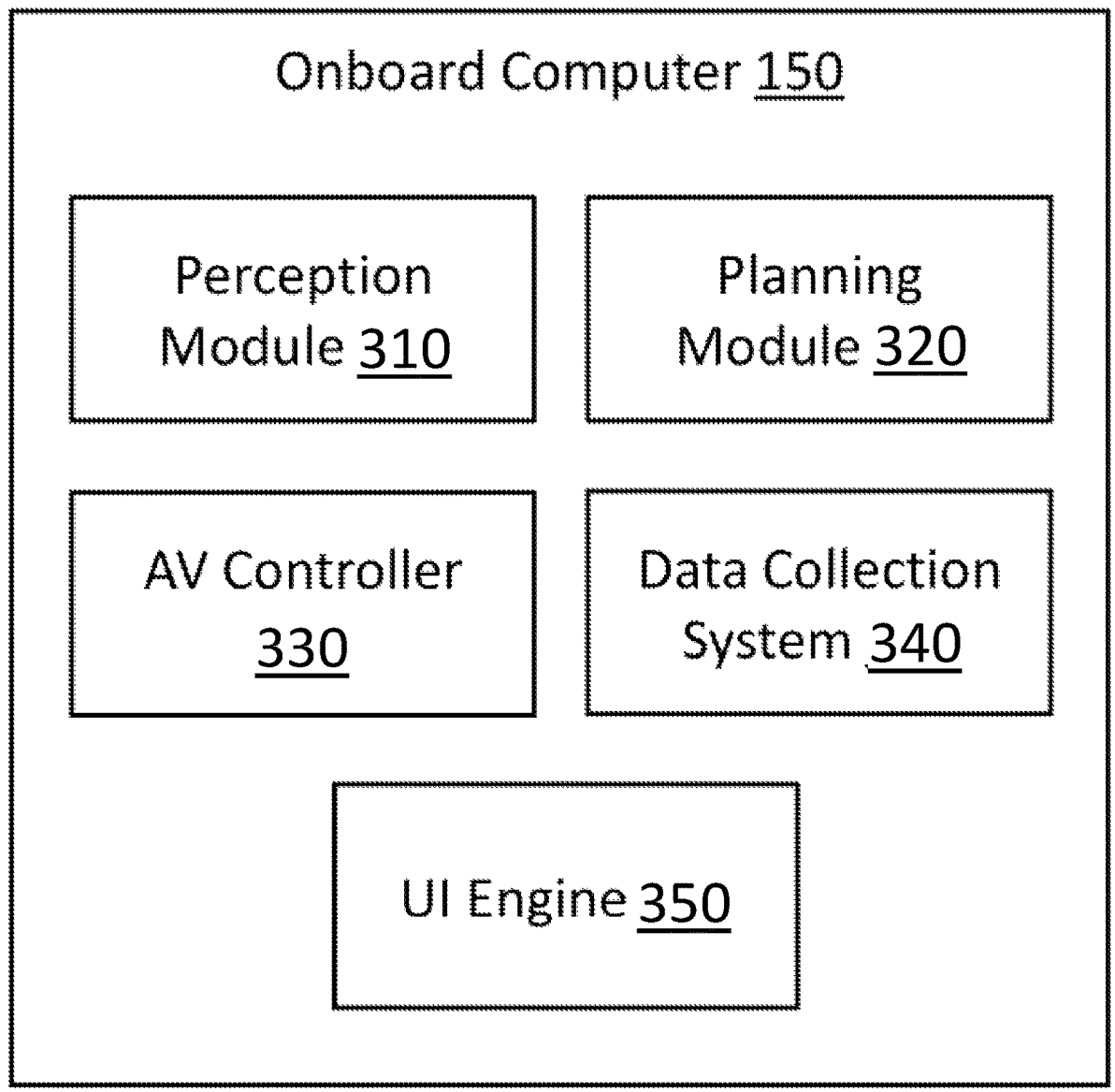
FIG. 3 is a block diagram illustrating an on-board computer according to some embodiments of the present disclosure.

FIG. 3 is a block diagram illustrating the on-board computer 150 according to some embodiments of the present disclosure. The on-board computer 150 includes a perception module 310, a planning module 320, an AV controller 330, a data collection system 340, and a UI engine 350. In alternative configurations, fewer, different and/or additional components may be included in the on-board computer 150. Further, functionality attributed to one component of the on-board computer 150 may be accomplished by a different component included in the on-board computer 150 or a different system than those illustrated.

The perception module 310 identifies objects in the environment of the AV 110. The sensor suite 140 produces a data set that is processed by the perception module 310 to detect other cars, pedestrians, trees, bicycles, and objects traveling on or near the road on which the AV 110 is traveling, and indications surrounding the AV 110 (such as construction signs, traffic cones, traffic lights, stop indicators, and other street signs). For example, the data set from the sensor suite 140 may include images obtained by cameras, point clouds obtained by LIDAR sensors, and data collected by RADAR sensors. The perception module 310 may include one or more classifiers trained using machine learning to identify particular objects. For example, a multi-class classifier may be used to determine whether each object in the environment of the AV 110 is one of a set of potential objects, e.g., a vehicle, a pedestrian, or a bicyclist. As another example, a pedestrian classifier recognizes pedestrians in the environment of the AV 110, a vehicle classifier recognizes vehicles in the environment of the AV 110, etc. The perception module 310 may also perform predictive analysis on some recognized objects, e.g., to determine projected pathways of other vehicles, bicycles, and pedestrians.

In some embodiments, settings of the perception module 310 can be adjusted to better sense particular types of objects, e.g., by adjusting how much processing power of the perception module 310 is devoted to a particular different type of objects and calculating predictions for such objects. For example, in a high-pedestrian area, the perception module 310 can be tuned to devote more computing resources to identifying and tracking pedestrians. As another example, the settings of the sensor suite 140 can be adjusted to better sense in a particular direction, e.g., a camera may receive images at a higher rate in the direction of a high-traffic bicycle lane, or a RADAR sensor (e.g., an articulating RADAR array) may be focused towards an upcoming intersection. The perception module 310 may devote more processing resources to processing data from a particular direction, e.g., the direction of the bicycle lane or intersection.

The settings of the perception module 310 may be selected based on lane parameters and/or performance metrics. The navigation system 270 may determine that the lane selected for the AV 110 to travel has a performance metric below a threshold performance metric, and identifies a parameter or set of parameters of the lane that contributes to the performance metric being below the threshold performance metric. For example, the navigation system 270 determines that a selected lane for the AV 110 has a low-performance metric due to a hidden high-traffic driveway that enters the lane. In response, the navigation system 270 adjusts a setting of the perception module 310 based on the identified parameter so that the perception module 310 is better attuned to a particular hazard or condition associated with the lane. For example, the perception module 310 adjusts a setting to apply more processing resources for looking for vehicles entering the roadway. As another example, the perception module 310 adjusts a setting to collect more detailed and/or frequent data in the direction of the driveway, and to devote more processing resources to the extra obtained data.

The planning module 320 plans a path for the AV 110 based on data received from the perception module 310 and from navigation information received from the navigation system 270. The planning module 320 determines a planned pathway for the AV 110 to follow based on the route and lane selected by the navigation system 270. When objects are present in the environment of the AV 110, the planning module 320 determines the planned pathway for the AV 110 based on predicted pathways of the objects and right-of-way rules that regulate behavior of vehicles, bicycles, pedestrians, or other objects. The planned pathway includes locations for the AV 110 to maneuver to, and timing and/or speed of the AV 110 in maneuvering to the locations.

In some embodiments, the planning module 320 plans that path based on lane parameters and/or performance metrics. The planning module 320 may, for example, select a lower speed for driving on a road with a low-performance metric to prevent a low-performance ride, e.g., to avoid collisions, sudden braking or swerving, or takeovers. The planning module 320 may make specific path adjustments based on one or more parameters of the selected lane. For example, while driving on the lane with the hidden high-traffic driveway described above, the planning module 320 may plan a path with a lower velocity than the planning module 320 typically selects for the roadway type to reduce the likelihood of sudden braking events or collisions near the driveway. As another example, the navigation system 270 provides parameters describing a high-traffic bicycle lane to the right of the selected lane, the bicycle lane resulting in lower performance on the selected lane. The planning module 320 plans a path in response to this bicycle lane, e.g., a path that is further to the left in the selected lane than the AV 110 normally drives, to avoid bicycles that may edge into the selected lane from the bicycle lane.

The AV controller 330 instructs the movement-related subsystems of the AV 110 to maneuver according to the planned pathway provided by the planning module 320. The AV controller 330 may include the throttle interface for controlling the engine throttle, motor speed (e.g., rotational speed of electric motor), or any other movement-enabling mechanism; the brake interface for controlling the brakes of the AV 110 (or any other movement-retarding mechanism); and the steering interface for controlling steering of the AV 110 (e.g., by changing the angle of wheels of the AV).

The data collection system 340 collects data describing trips by the AV 110 and reports the data to the fleet management system 120, which stores the data in the AV database 240. The data collection system 340 collects data indicating which lane of a road on which it is driving, and creates data records that are linked to the lane. The data records may include, for example, images, point clouds, speed records, traffic data, takeover data, collision data, and IMU data.

Figure 4A:
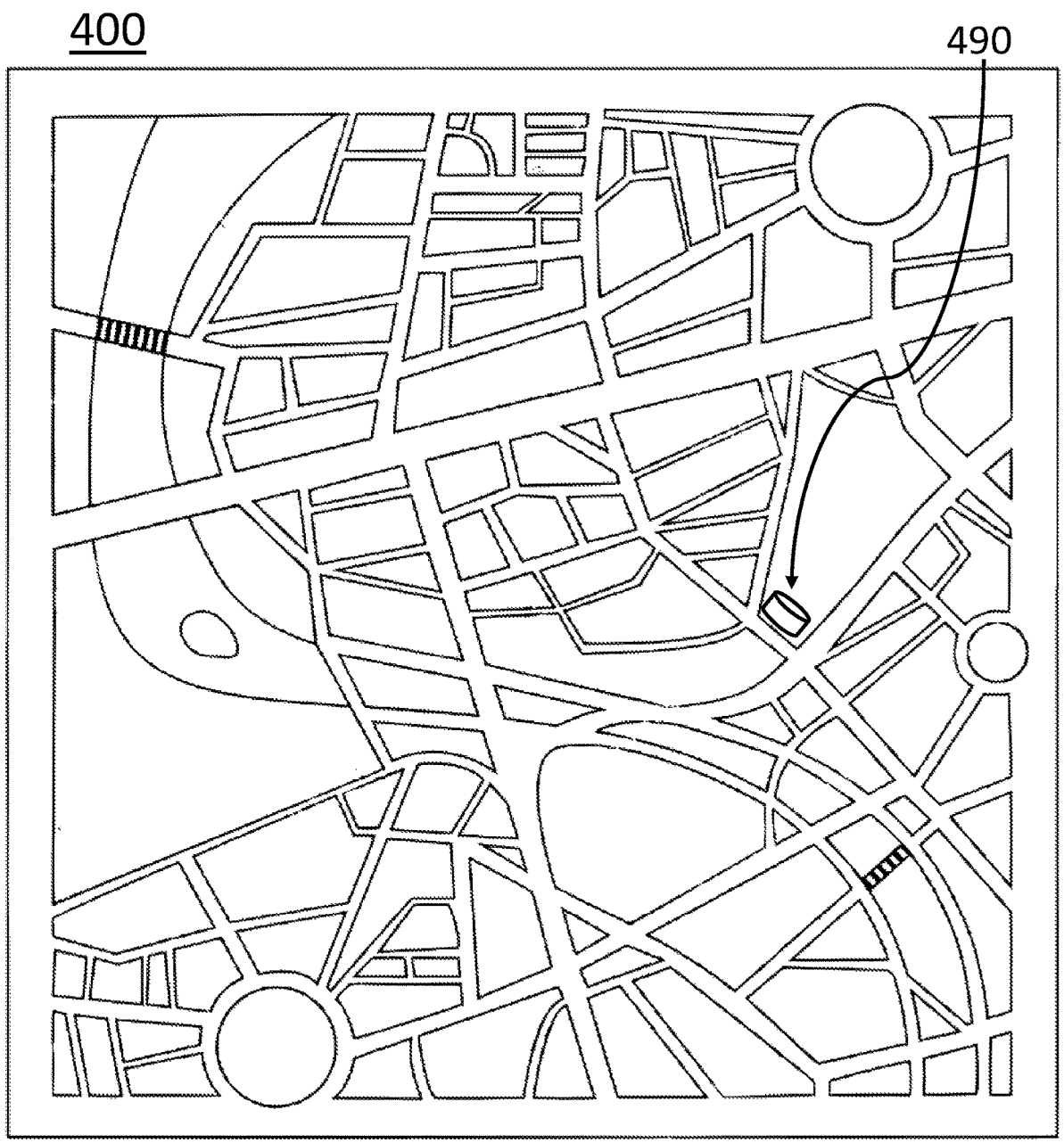
FIG. 4A depicts an exemplary ODD at time, $t_0$, according to some embodiments of the disclosure.

The UI engine 350 generates a GUI that displays information about the AV 110, such as the planned pathway, to a user on a screen of a user device. The user device may be mounted in the AV 110, e.g., as a display screen or touchscreen mounted in the dashboard, or a tablet mounted in the AV 110. As another example, the user device is a device, such as a smartphone or tablet, used by a safety driver during testing of the AV 110. The UI engine 350 receives data from other components of the on-board computer 150, e.g., data from the planning module 320 describing the planned pathway of the AV 110. The UI engine 350 may also receive data describing performance metrics from the navigation system 270. The UI engine 350 may provide alerts to an operator (e.g., a safety driver) when the performance metric is below a threshold performance metric, indicating that the operator should pay particular attention. The UI engine 350 may include information describing the one or more parameters that contribute to the low-performance metric, e.g., a warning about a hidden driveway, or an upcoming visual obstruction, so the operator can pay particular attention to these hazards or conditions Example Serviceable Road Network with Dynamic Geofencing FIG. 4A depicts an exemplary service area network at time, to, according to some embodiments of the disclosure. A service area network is a term which may define conceivable overlapping conditions, use cases, restrictions, and scenarios that an AV might encounter, even the most esoteric edge cases. Common service area network factors are time-of-day, safety, legal permissibility (including time-of-day), weather, terrain, and road features. The shape of the service area network can affect serviceable road network fragility. For example, geographic bottlenecks can produce choke points. In some embodiments, a service area network can be an operation design (ODD) which can be defined as the operating conditions under which a given driving automation system or feature thereof is specifically designed to function, including, but not limited to, environmental, geographical, and time-of-day restrictions, and/or the requisite presence or absence of certain traffic or roadway characteristics.

An ODD may put limitations on: the road environment; the behavior of the automated driving system (ADS) equipped subject vehicle; and state of the vehicle. Generic road environment limitations may include types of roads (urban, rural, or freeways), specific elements such as roundabouts or tunnels, temporary structures such as construction zones, traffic volumes, and weather and visibility conditions. Road environment limitations may also be specific, such as a geographical area, or season, or time of the day.

Road environment limitations are the most common elements of a service area network, but a service area network may also place limitations on ADS behavior and state. Limitations on ADS behavior may include speed limitations or limitations on maneuvers, such as reversing. Limitations on the state of the subject vehicle may include the requirement of no trailer being attached, loading limitations, or minimum tire inflation level. The service area network may reflect the requirements of a particular driving automation feature. A driving automation system feature may be defined as "a level 1-5 driving automation system's design-specific functionality at a given level of driving automation within a particular service area network, if applicable" Examples of driving modes include low-speed traffic jam assist, high-speed cruise assist, valet parking, and urban in-lane driving.

In one or more embodiments, avoidance areas are geographic areas and locations which are excluded from the service area network, in practice. Collectively, avoidance areas are grouped together into an avoidance area, in some embodiments. The avoidance areas are what defines a service area network, at least in theory. As discussed, avoidance areas are ever changing. Accidents, gridlocked traffic, road closures, utility (e.g., water main) breakages are all examples of transient members of an avoidance areas group. These are reacted to and reflected in the service area network. However, proper implementation and enforcement is important. That is, alternate routes need to be available or risk stranding an AV—and potentially a passenger—in a cut off zone. With careful analysis and prudent service area network enforcement, AVs are able to return to areas which are more routable or at least in a direction towards their launch facility.

Choke points or bottlenecks are areas of a service area network whose reachability is threatened through said area. Typically, choke points are one lane or a set of lanes, sometimes referred to as edges which will be discussed in greater detail later in the disclosure. Choke points give rise to the notion of fragility. Map fragility can be thought of as parts of a serviceable road network which are susceptible to being cut off from other parts of the serviceable road network. Fragility can also be used in the context of a service metric for a particular area, in some embodiments.

Another factor contributing to serviceable road network fragility is AV limitations. For example, in an area of the serviceable road network exhibiting low or compromised traction can limit some or all AV from traveling there. Map fragility may be affected by safety concerns, such as avoidance of zealous political rallies in the capital, and other temporary events. In an environment where our AVs are serving customers, it is desired to protect customers from fragile parts of the serviceable road network because there is a probability that large portions of the serviceable road network will become unavailable. If an AV becomes cutoff, physical retrieval of the AV may be necessary because the AV becomes isolated from the rest of the serviceable road network thereby disrupting service. If this happens, it will generate negative public perception and require significant operational coordination to resolve.

Choke points are critical to maintaining portions of the serviceable road network, and if cut off by an avoidance area, all AVs in the disconnected region will simultaneously require a VRE. Additionally, choke points make service area networks vulnerable to large-scale routable graph collapse due to having limited paths of redundancy in certain regions. Turning to FIG. 4A, serviceable road network 400 depicts a service area network at time, to, comprises launch facility 490. One skilled in the art can appreciate that serviceable road network 400 reflects a time-of-day in which AVs are not permitted in the example city as shown. For example, let's assume that to is just before AV operation time at the launch facility 490. Consequently, the entire serviceable road network 400 is a part of the avoidance areas and there is no service area network.

Figure 4B:
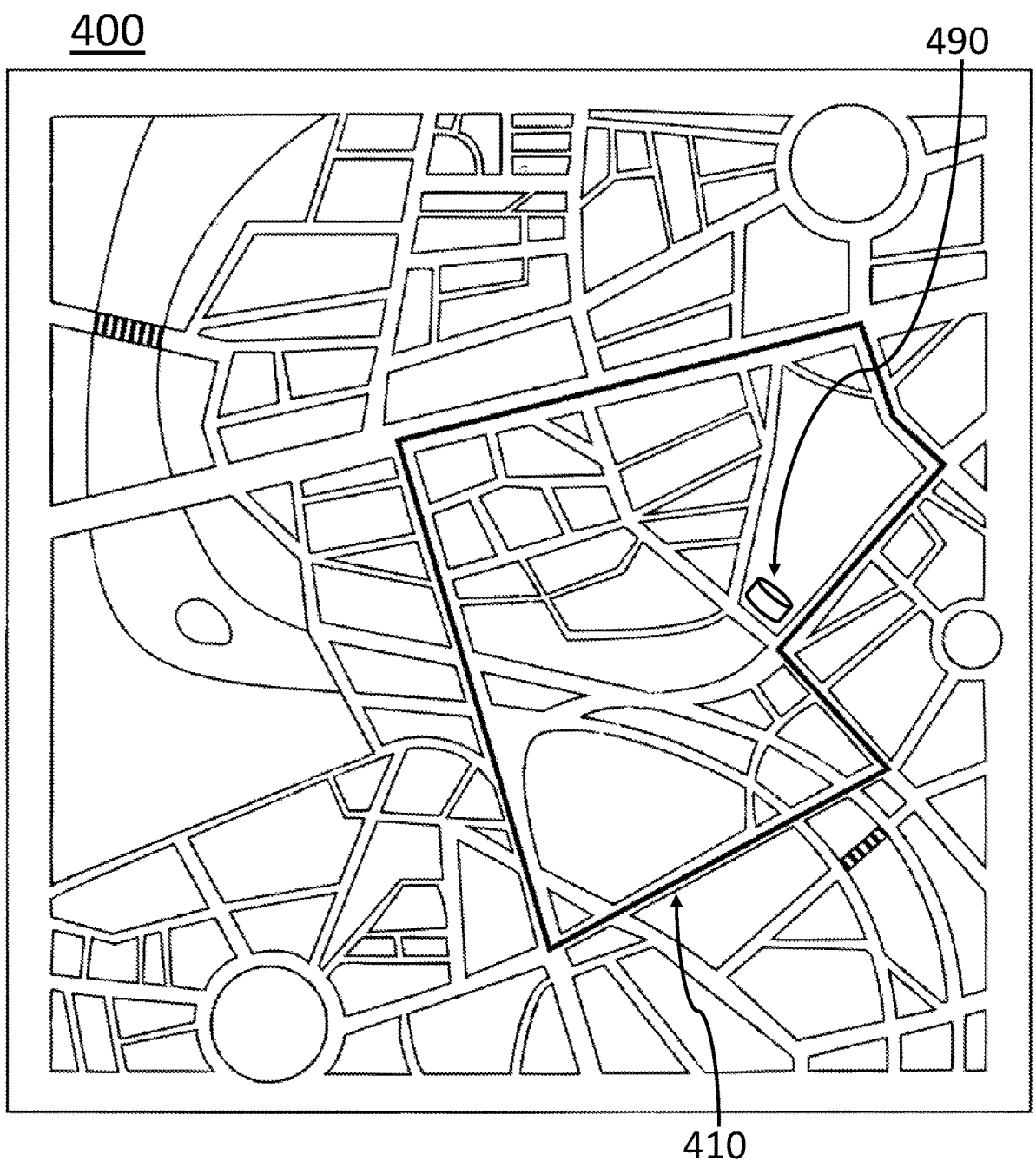
FIG. 4B depicts an exemplary ODD at time, $t_1$, according to some embodiments of the disclosure.

FIG. 4B depicts an exemplary service area network at time, $t_1$, according to some embodiments of the disclosure.

Service area network 400 comprises launch facility 490 and geofence 410. The present state may represent an initial launch of AVs for the day from the launch facility. As can be appreciated, everywhere outside geofence 410 is a part of the avoidance areas.

A geofence is a virtual perimeter for a real-world geographic area. In some embodiments, geofences are dynamically generated (as in a radius around a point location) or match a predefined set of boundaries (such as school zones or neighborhood boundaries). The use of a geofence is called geofencing, and one example of use involves a location-aware device of a location-based service (LBS) user entering or exiting a geofence. This activity could trigger an alert to the device's user as well as messaging to the geofence operator. This info, which could contain the location of the device, could be sent to a mobile telephone or an email account.

Geofencing uses technologies like GPS, or even Internet Protocol address ranges to build their virtual fence. These virtual fences can be used to track the physical location of the device active in the particular region or the fence area. The location of an AV using the device is taken as geocoding data and can be used further for advertising purposes.

In some embodiments, a geofence is a virtual perimeter for a real-world geographic area. Geofences can be dynamically generated (as in a radius around a point location) or match a predefined set of boundaries (such as school zones or neighborhood boundaries). A geofence can be exclusive, restricting operation/activity within its defined area, or inclusive, allowing operation/activity only within its defined area. The use of a geofence is called geofencing, and one example of use involves restricting the navigation of an AV, which is continually aware of its own location, to locations within the geofence through the use of routing software.

Figure 4C:
FIG. 4C depicts an exemplary ODD at time, $t_2$, according to some embodiments of the disclosure.

FIG. 4C depicts an exemplary service area network at time, $t_2$, according to some embodiments of the disclosure. Map 400 comprises launch facility 490, geofence 410, and geofence 430. In the present embodiment, the service area network has now opened up to areas within geofence 430 and now comprises geofence 410 and geofences 430 areas. They could be represented by a solid perimeter enclosing both areas. However, in some embodiments different serviceable road network areas could have varying states of fragility or fragility ratings. This can occur if some or all of the geofenced area (e.g., 430) is threatened from being accessible. This will be discussed in greater detail later in the disclosure.

Figure 4D:
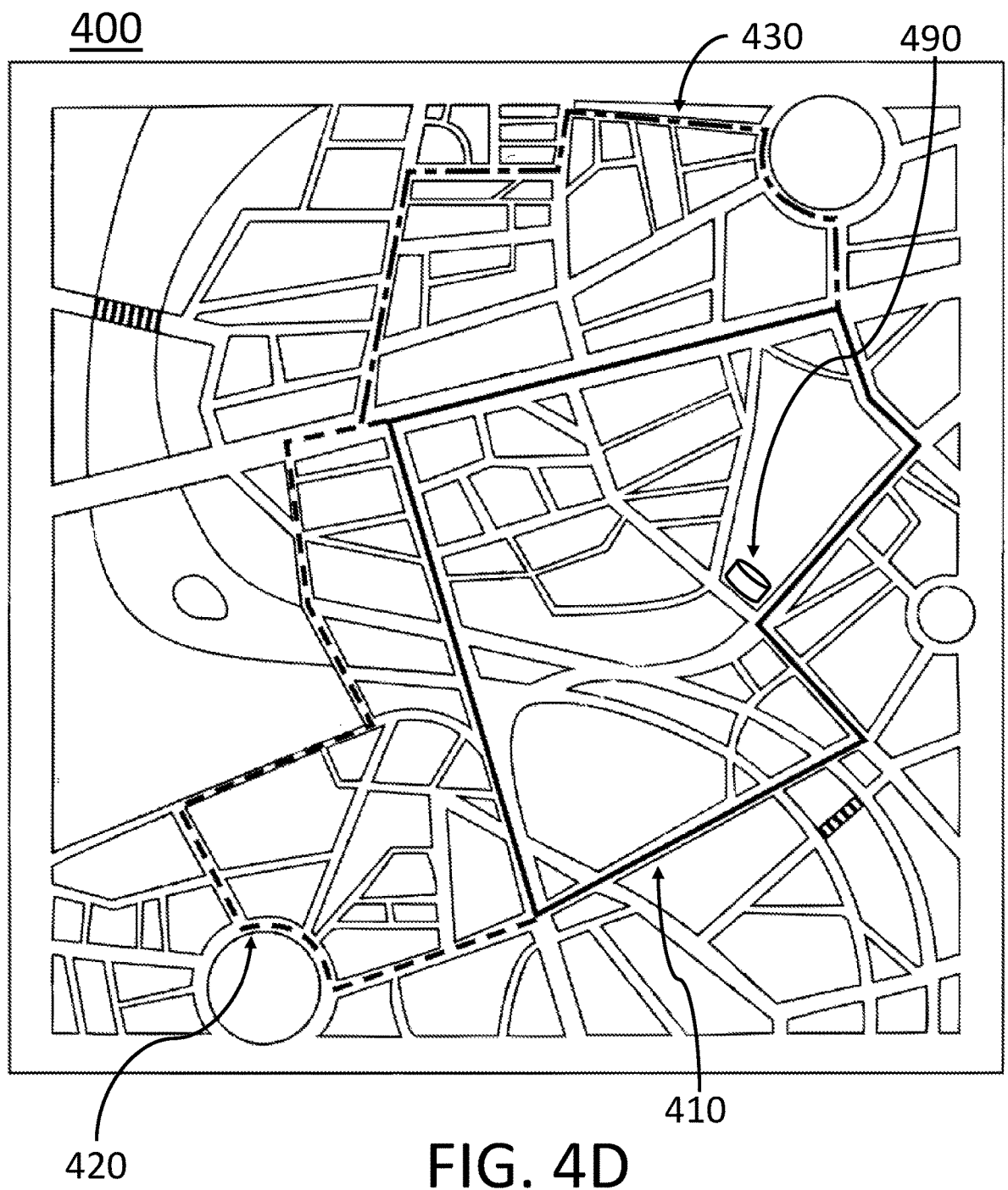
FIG. 4D depicts an exemplary ODD at time, $t_3$, according to some embodiments of the disclosure.

FIG. 4D depicts an exemplary service area network at time, $t_3$, according to some embodiments of the disclosure. Map 400 comprises launch facility 490, geofence 410, geofence 420, and geofence 430. In the present embodiment, the service area network has now opened up to areas within geofence 420 and geofence 430 and now comprises geofence 410, geofence 420, and geofences 430 areas. They could be represented by a solid perimeter enclosing both areas. However, in some embodiments different serviceable road network areas could have varying states of fragility, fragility ratings, closures and/or anticipated avoidance areas. For example, there may be an event due to start in geofence 430, while geofence 420 may have limited accessibility. The AVs in each geofence, 420, 430 may be given varying instructions depending on the geofence state, condition of avoidance areas within.

Figure 5:
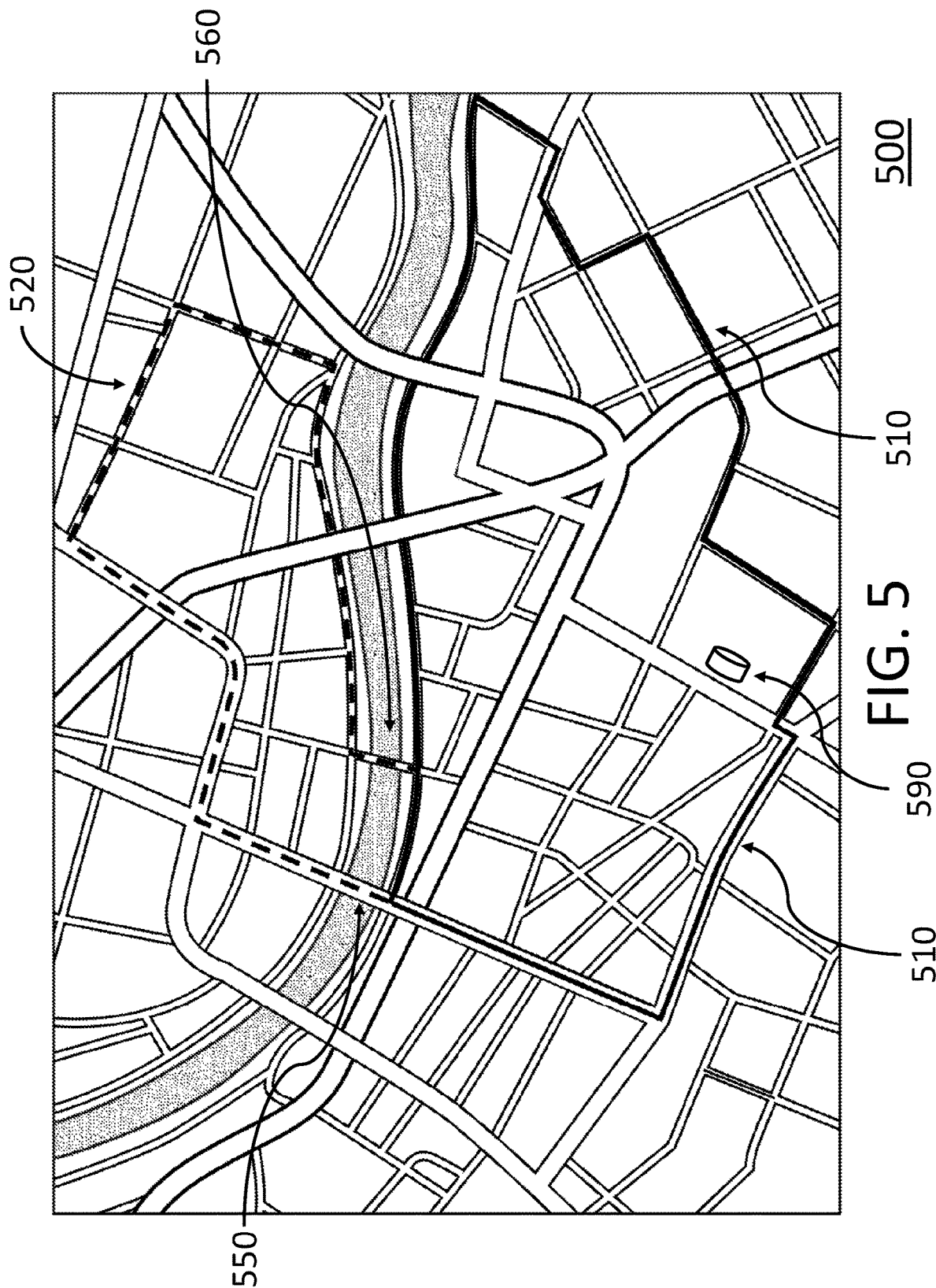
FIG. 5 depicts an exemplary serviceable road network illustrating choke points and fragility according to some embodiments of the disclosure.

Example Serviceable Road Network with Dynamic Geofences and Exemplary Choke Points FIG. 5 depicts an exemplary serviceable road network 500 illustrating choke points, serviceable road network fragility, and service islands, according to some embodiments of the disclosure. Map 500 comprises geofence 510, geofence 520, choke point 550, choke point 560, and vehicle launcher 590.

A choke point can be a single-lane or a set of lanes. In the present embodiment choke point 550 comprises two lanes, one going in each direction (over the bridge). Two lanes in opposing directions which have open routability are sometimes called strongly connected. In practice, the first step is to identify a choke point within an ODD. Graph theory is used in some embodiments to facilitate this identification.

In mathematics, graph theory is the study of graphs, which are mathematical structures used to model pairwise relations between objects. A graph in this context is made up of vertices (also called nodes or points) which are connected by edges (also called links or lines). A distinction is made between undirected graphs, where edges link two vertices symmetrically, and directed graphs, where edges link two vertices asymmetrically. Graphs are one of the principal objects of study in discrete mathematics.

More abstractly, choke points can be defined as lanes whereby its removal would engender areas of the serviceable road network to be cutoff, either in one or both directions. This usually results in more catastrophic effects, as a choke point can have indirect consequences, such as, the removal of the opposing lane and the upstream lane feeding into it. Choke points can also affect another serviceable road network area downstream from the choke point itself. A choke point can even remove entire constellations which are a plurality of serviceable road network areas and/or nodes. In some embodiments, the upstream lane and downstream lane can be considered a predecessor lane and a successor lane, respectively.

In one or more embodiments, choke points are identified through simulation. Specifically, this is performed by iterating through all the edges (lanes) and removing them one by one to see if it causes a serviceable road network area/section to become fragile. Fragility can be quantified as a function of how many routable lanes it is limited to, in order to cut off. For example, if one of the bridges in serviceable road network 500 which connects geofence 510 area to geofence 520 area is a two-lane throughway (one in each direction), choke point 550 would produce a condition of high fragility for serviceable road network area east 520 because it is susceptible to cut off from geofence 510. The condition would be ameliorated if the bridge comprised 4 lanes (two in each direction). In practice, the simulator would iterate through each lane. In other embodiments with lower granularity, the simulator would lump lanes/areas together. And in other embodiments, the simulator could forgo serviceable road network areas less traveled and focus on predetermined arteries.

After identification, live monitoring is performed through tooling, such as visual analysis and/or simulation. In some embodiments, a coverage serviceable road network is rendered, akin to a cell phone service provider, thereby illustrating a coverage metric. Corridor monitoring is applied to serviceable road network areas, e.g., geofence 520 and can be performed by one or more predetermined algorithms.

In the present embodiment, choke points 550, 560 have already been identified and produced a condition whereby service island is created in geofence 520 and is cut off from geofence 510. Ordinarily, geofence 510 and geofence 520 would be comprised by the ODD if they had sufficient connectivity.

In practice, after choke point identification, a polygon would be created for each choke point 550, 560. A polygon is a plane figure that is described by a finite number of straight-line segments connected to form a closed polygonal chain (or polygonal circuit). The bounded plane region, the bounding circuit, or the two together, may be called a polygon. The segments of a polygonal circuit are called its edges or sides. The points where two edges meet are the polygon's vertices or corners. The interior of a solid polygon is sometimes called its body. In some embodiments, polygons can be used in computer graphics to compose images that are three-dimensional in appearance. Usually (but not always) triangular polygons arise when an object's surface is modeled, vertices are selected, and the object is rendered in a wire frame model. This can be useful in modeling.

During monitoring, a hybrid polygon is created on the serviceable road network and gives rise to hyper-localized ODDs. In practice, the tooling monitor constantly looks for changes in the tile Once changes were detected, downstream effects could be analyzed, through visual analysis and simulation. Identified sets of lanes and sections on the serviceable road network (both direct and upstream) that will contribute to increased serviceable road network fragility if disconnected.

In operation, chokepoints can be monitored using automated tools to understand how far the serviceable road network is from a complete disconnect. On a spectrum of choke and reachability, each hybrid polygon can be assigned a score. With an understanding of the state of the serviceable road network at any given moment, different responses can be triggered to the customer service area based on the level of tolerable risk.

Turning to FIG. 5, choke point 550 has been identified as an impassable condition, in at least one direction. Consequently, instructions can be sent to AV to exit geofence 520 through choke point 560 at the earliest opportunity. That is, after passenger drop-off, for example. At the same time, the system router could be updated such that no more destinations can be requested within geofence 520. The avoidance areas could also be updated to include areas within geofence 520. This scenario would be exemplary of prophylactic actions. Specifically, an impassable condition in both choke points 550, 560 hasn't been reached; yet, there is significant restriction and/or anticipation/probability that a serviceable road network area could be severed. This could be a result of vigilant monitoring in high granularity by a hybrid polygon.

In some embodiments, FIG. 5 shows geofence 520 which has been entirely cut off from the service area network and is no longer a part of the service area. In particular, choke points 550, 560 are now included in the avoidance areas. In some embodiments, AVs will attempt to self-evict to protect from probability of serviceable road network collapse. If the AV is occupied, the AV will attempt to arrive at its destination if within the cutoff area, e.g., geofence 520 area, before self-evicting. This ensures that existing customer trips will not be disrupted.

In some embodiments, routable graphing could be used to route stranded AV's to other cutoff areas. For example, AVs in geofence 520 may be rerouted to another service island. However, this still requires operation involvement to shuttle AVs from one disconnected island to another and typically only solves intra-island trips. Stranded AVs will still have to be recovered in a VRE and returned to vehicle launcher 590, which is undesirable.

Example of Autonomous Vehicle Map Dashboard

Figure 6:
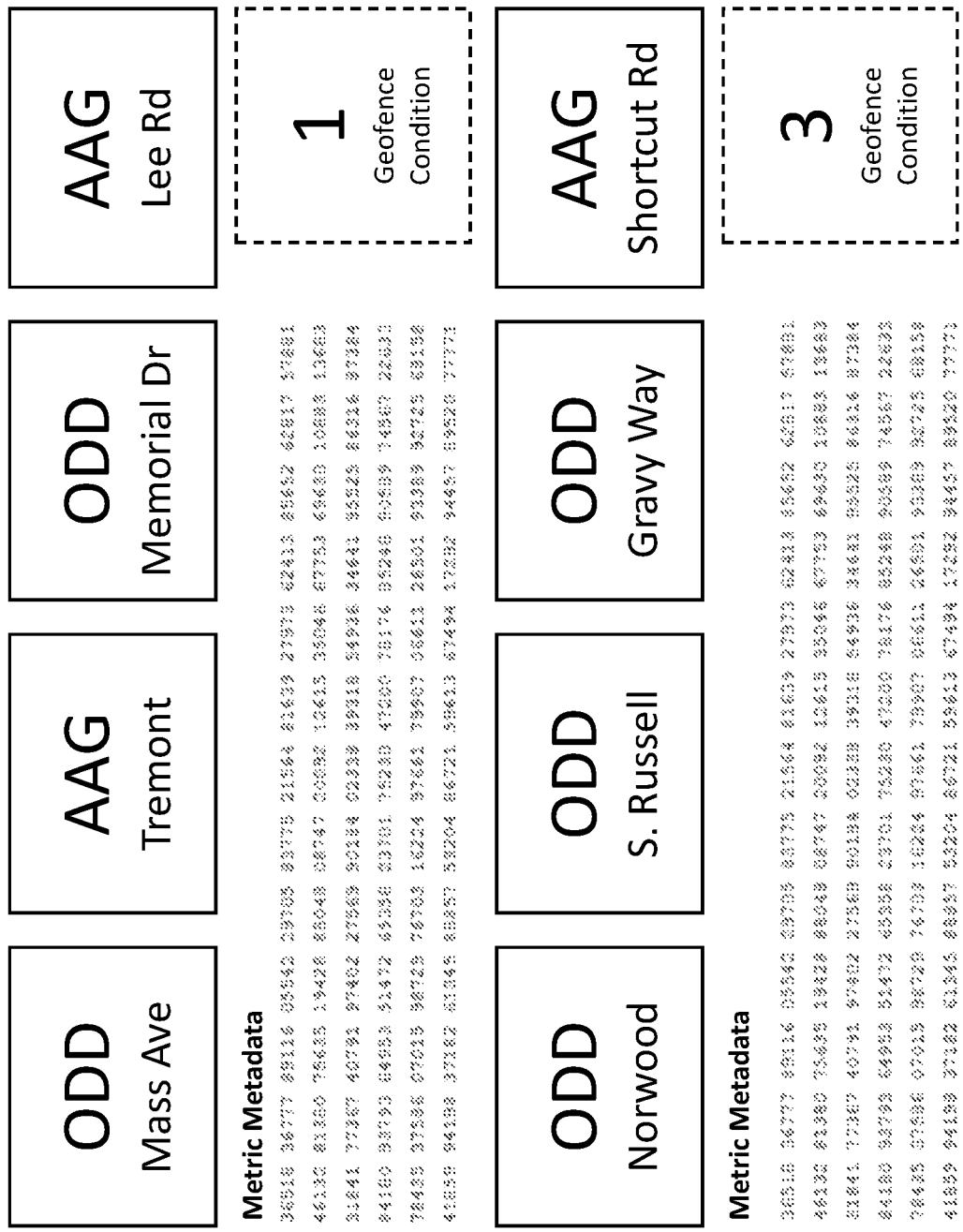
FIG. 6 is an exemplary dashboard, according to some embodiments of the invention.

FIG. 6 is an exemplary interface for monitoring a fleet of autonomous vehicles in communication with a central computer in various service areas, according to some embodiments of the invention. Dashboard 600 depicts status data of two serviceable road network areas. In some embodiments, solid line boxes can represent potential choke points or a set of nodes, with the present connectivity displayed. In some embodiments, the current state could be listed as ODD or avoidance area group (AAG), however, other states with finer granularity are not beyond the scope of the present disclosure. For example, Tremont might be a node which is inaccessible. In the present example, the blockage for various reasons thereby produces an avoidance area denotation. As a result, the Tremont is removed from the surrounding ODD. Conversely Mass Ave is still accessible and a part of the ODD, which is reflected by its condition state. Data is fed from Metric Metadata which can be updated in real-time or from software tooling or a routable graph service, or other suitable means.

In one or more embodiments, a geofence condition is displayed for each map area. Geofence conditions could be calculated from the connectivity from each of the nodes, at least in part. In the present example, a geofence condition can range from 1 to 5 with a 1 indicating a most inaccessible map. However, any scoring system is not beyond the scope of the present disclosure. As one skilled in the art can appreciate, a geofence condition of 1 for the upper map area of the chart stems from the poor connectivity to two of its nodes.

In another example, Shortcut Rd is a node which is cut off, thereby producing an avoidance area metric. In such a situation, the system of the present disclosure would determine the downstream effect of the fragile map area. As such, the system may be configured to self-evict AVs in or around Lee Rd and Shortcut Rd. Additionally, lanes feeding these fragile areas may be removed from the ODD, at least temporarily. In some embodiments, connectivity of a node, neighborhood, and/or constellation can be quantified and qualified. For example, service areas which are unimpeded by surrounding connections (e.g., lane segments) could be scored to high-connectivity. Service area which are surrounded by traffic and/or lane closures may yield a medium connectivity. Still, those service areas threaten by choke points and/or completely cut off may exhibit a low-connectivity score. These connectivity scores could be used in the determination of geofence state, at least in part.

Example of Autonomous Vehicle Fleet

Figure 7:
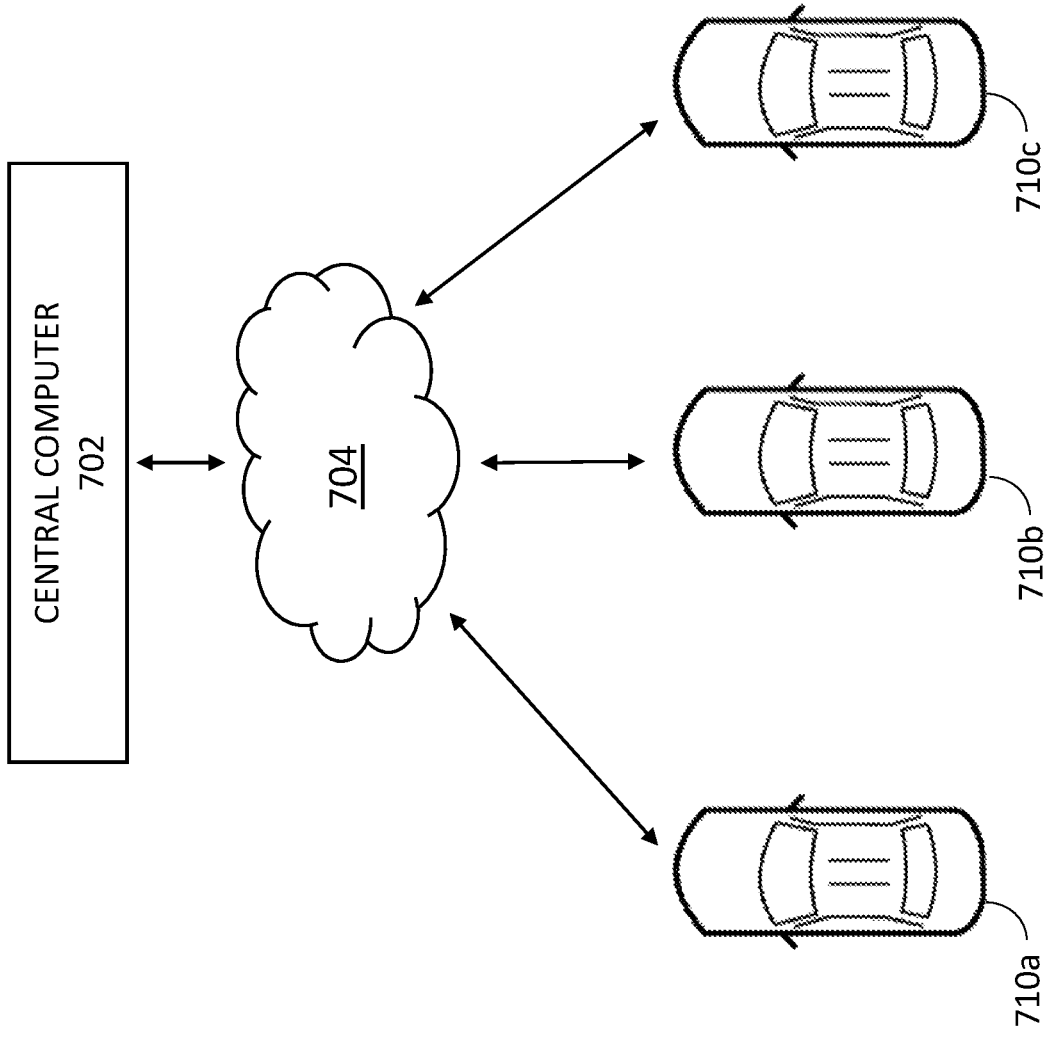
FIG. 7 is a diagram illustrating a fleet of autonomous vehicles in communication with a central computer, according to some embodiments of the invention.

FIG. 7 is a diagram illustrating a fleet of autonomous vehicles 710a-710c in communication with a central computer 702, according to some embodiments of the disclosure. As shown in FIG. 7, the vehicles 710a-710c communicate wirelessly with a cloud 704 and a central computer 702. The central computer 702 includes a routing coordinator and a database of information from the vehicles 710a-710c in the fleet. Autonomous vehicle fleet routing refers to the routing of multiple vehicles in a fleet. In some implementations, autonomous vehicles communicate directly with each other. The vehicles 710a-710c include structural integrity monitoring systems. In various examples, when the structural integrity monitoring systems in one or more of the vehicles 710a-710c flags an outlier, the information is communicated with the central computer 702.

When a ride request is received from a passenger, the routing coordinator selects an autonomous vehicle 710a-710c to fulfill the ride request, and generates a route for the autonomous vehicle 710a-710c. The generated route includes a route from the autonomous vehicle's present location to the pick-up location, and a route from the pick-up location to the final destination.

Each vehicle 710a-710c in the fleet of vehicles communicates with a routing coordinator. In some examples, the vehicles 710a-710c send information to the routing coordinator such as structural health data. In various examples, structural integrity data indicates outlier measurements or potential structural integrity problems, the routing coordinator directs the autonomous vehicle to return to a service center for inspection and/or repair.

Additionally, information gathered by various autonomous vehicles 710a-710c in the fleet can be communicated with the routing coordinator, where it is saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. Data can also be used to avoid various road hazards, such as potholes and speed bumps.

According to various implementations, a set of parameters can be established that determine which metrics are considered (and to what extent) in determining routes or route modifications. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In another example, a routing goal includes minimizing power expenditure and conserving charge on the high voltage battery of the vehicle.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals takes priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an on-board computer on the selected autonomous vehicle generates a route and navigates to the destination and/or any intermediate stop. Similarly, in some examples, during an intermediate stop, the on-board computer determines whether the autonomous vehicle parks or continues to drive and circles back to the pick-up location. In some implementations, the routing coordinator in the central computing system 702 generates a route for each selected autonomous vehicle 710a-710c, and the routing coordinator determines a route for the autonomous vehicle 710a-710c to travel from the autonomous vehicle's current location to a first intermediate stop.

In some implementations, each vehicle 710a-710c provides an indication of the state-of-charge of the vehicle's battery to the central computing system 702. The central computing system 702 may include one or more battery data databases to store state-of-charge for each vehicle 710a-710c. The battery data databases may be communicatively coupled to the central computing system 702 and the battery data databases may be stored on one or more servers and/or other memory devices. The battery data databases may store data related to charging and/or discharging of batteries, such as charging curves of the batteries and/or discharging curves of the batteries.

In various implementations, the central computing system 702 determines power requirements for various routes, and state-of-charge of the battery in each vehicle 710a-710c is considered in selecting a vehicle to fulfill a route request. Furthermore, the central computing system 702 can predict when a vehicle 710a-710c state-of-charge will reach a low level, and determine when the vehicle 710a-710c will be routed to a charging center.

The central computing system 702 and routing coordinator may further include data regarding battery maintenance activities during routing assignments. The data regarding battery maintenance activities may include allowable charging frequency for the routing assignments (i.e., how often a battery may be charged during the assignments, which may be indicated as the minimum amount of time between which a vehicle can return to a charging station for charging of the battery), allowable charge-times (i.e., the maximum amount of time that a vehicle can remain at a charging station for a charge cycle of the battery before returning to routing assignments), amount of time the vehicle is to be on the road during the routing assignments, rates of charging available, or some combination thereof. The data regarding battery maintenance activity may be utilized by the central computing system 702 to determine and manage battery levels of the fleet of vehicles.

In some implementations, the central computing system 702 stores additional battery-related information for each vehicle in the battery databases. For example, the battery databases may include data regarding, battery age for batteries in each of the vehicles, cost of battery replacement for each of the batteries, effects on hardware of each of the vehicles, hardware arrangements of the vehicles (such as sensors of the vehicles, control systems of the vehicles, and/or software implemented on the vehicles), or some combination thereof. The central computing system 702 may utilize the vehicle-specific information to determine vehicle-specific current draw from the battery and/or the cost of replacing the battery.

The central computing system 702 battery database may further include data related to environmental factors for the routing assignments, since environmental factors can affect power usage. The data related to the environmental factors may include environmental data (such as temperature, wind, and/or rain) and route data (such as grades of the terrain) for the routing assignments. In some embodiments, the battery databases may further include data indicating the effects of the environmental factors on current draw and/or charging due to regenerative braking for the routing assignments. The central computing system 702 utilizes the data related to the environmental factors to compensate for changes in the amount of charge used for the routing assignments and/or the current draw on the batteries of the vehicles when assigned to the routing assignments.

In some implementations, the central computing system 702 receives indications of battery states for the batteries of the vehicles in the fleet. The central computing system 702 can generate or update one or more state-of-charge profiles for each of the batteries based on a determined degradation level and the data from the battery databases. Each state-of-charge profile of the state-of-charge profiles may include an upper bound value that indicates a maximum optimal charge for the battery and a lower bound value that indicates a minimum optimal charge for the battery. Each state-of-charge profile also includes a low threshold state-of-charge for triggering an automatic shutdown event.

In some implementations, the central computing system 702 flags rider stranded issues for a vehicle and sends instructions to the vehicle to drive to a VRE, as described with respect to FIG. 4-5.

In some implementations, the central computing system 702 determines characteristics for the routing assignments. For example, the characteristics may include the predicted amounts of energy for the routing assignments, the anticipated charging frequency for each vehicle, the charge-times for each vehicle, the amount of time each vehicle will be on the road, and/or the rate of charging available. Based on the characteristics, the central computing system 702 selects vehicles from the available vehicles that satisfy the characteristics of the routing assignments.

Example Method for Determining Choke Points

Figure 8:
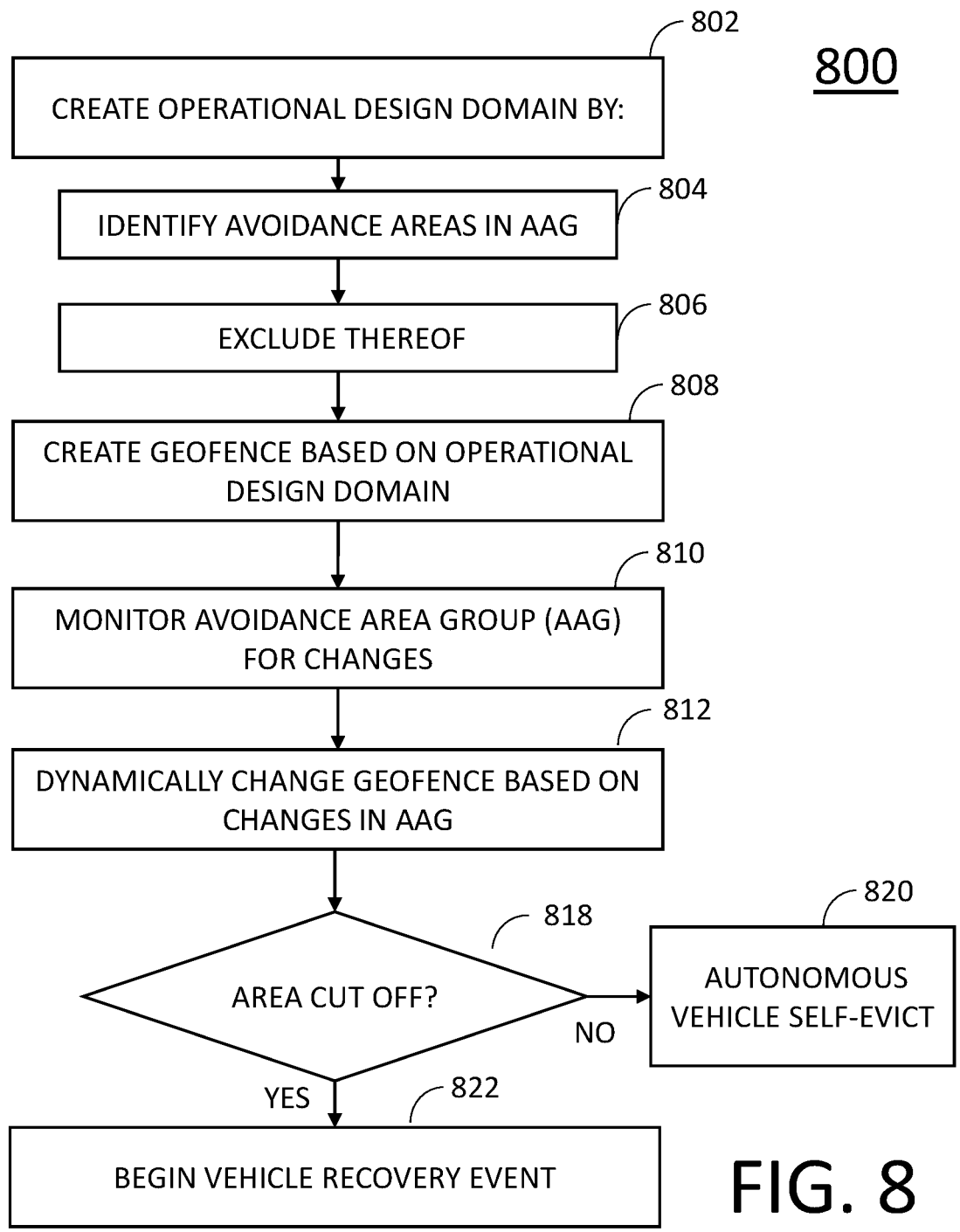
FIG. 8 shows an exemplary service coverage flowchart, according to some embodiments of the disclosure.

FIG. 8 shows an exemplary service coverage flowchart 800, according to some embodiments of the disclosure. A method for service disruption prevention through choke point monitoring begins with creating an ODD 802 from the map area. Avoidance areas are identified 804, as previously described. The creation of the ODD is manifested by the exclusion of the avoidance areas 806 for a given map area. Based on the ODD, one or more geofences are created 808.

In practice, the avoidance areas are monitored for changes 810. Any new inclusion in the avoidance areas would dynamically change the one or more geofences 812 by removing them from the ODD. Specifically, the geofence area would lessen. In some embodiments the parameter would shrink to reflect the cutoff area. In other embodiments, a figurative cutout would be implemented by the geofence in the ODD in order to avoid an area within a circumscribed ODD. Metaphorically, this is thought of as an ODD donut with the donut hole representing an avoidance area.

A newly restricted area in avoidance areas could then identify any AVs present. A fleet manager can then signal the AVs within the cut off area to self-evict after passenger drop-off. Otherwise, a vehicle recovery event could be initiated. Conversely, an exclusion (i.e., removal of avoidance area) in the avoidance areas would dynamically change the one or more geofences 812 by augmenting the ODD. Specifically, the geofence area would increase to accommodate the newly accessible area.

Example of a Computing System for Ride Requests

Figure 9:
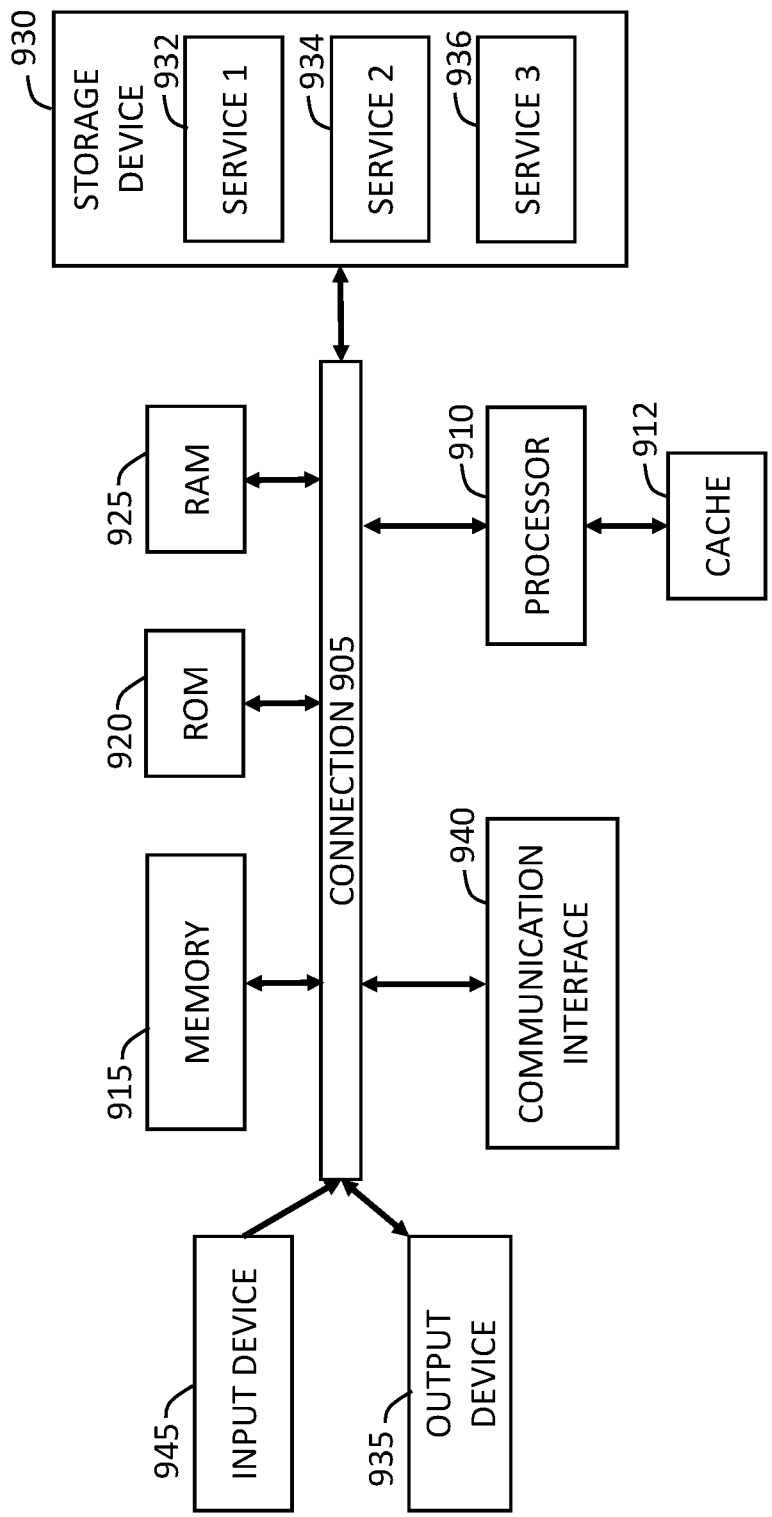
FIG. 9 shows an example embodiment of a system for implementing certain aspects of the present technology.

FIG. 9 shows an example embodiment of a computing system 900 for implementing certain aspects of the present technology. In various examples, the computing system 900 can be any computing device making up the on-board computer 104, the central computing system 902, or any other computing system described herein. The computing system 900 can include any component of a computing system described herein which the components of the system are in communication with each other using connection 905. The connection 905 can be a physical connection via a bus, or a direct connection into processor 910, such as in a chipset architecture. The connection 905 can also be a virtual connection, networked connection, or logical connection.

In some implementations, the computing system 900 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 900 includes at least one processing unit (central processing unit or processor) 910 and a connection 905 that couples various system components including system memory 915, such as read-only memory (ROM) 920 and random-access memory (RAM) 925 to processor 910. The computing system 900 can include a cache of high-speed memory 912 connected directly with, in close proximity to, or integrated as part of the processor 910.

The processor 910 can include any general-purpose processor and a hardware service or software service, such as services 932, 934, and 936 stored in storage device 930, configured to control the processor 910 as well as a specialpurpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction, the computing system 900 includes an input device 945, which can represent any number of input mechanisms, such as a microphone for speech, a touch-sensitive screen for gesture or graphical input, keyboard, mouse, motion input, speech, etc. The computing system 900 can also include an output device 935, which can be one or more of a number of output mechanisms known to those of skill in the art. In some instances, multimodal systems can enable a user to provide multiple types of input/output to communicate with the computing system 900. The computing system 900 can include a communications interface 940, which can generally govern and manage the user input and system output. There is no restriction on operating on any particular hardware arrangement, and therefore the basic features here may easily be substituted for improved hardware or firmware arrangements as they are developed.

A storage device 930 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROM, and/or some combination of these devices.

The storage device 930 can include software services, servers, services, etc., when the code that defines such software is executed by the processor 910, it causes the system to perform a function. In some embodiments, a hardware service that performs a particular function can include the software component stored in a computer-readable medium in connection with the necessary hardware components, such as a processor 910, a connection 905, an output device 935, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an Internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for preventing service disruptions in an autonomous vehicle fleet comprising identifying avoidance areas, populating an avoidance area group with the identified avoidance areas, defining an operational design domain by excluding the avoidance areas in the avoidance area group, at least in part, creating a first geofence comprised by the operational design domain, monitoring the avoidance area group for changes, and dynamically moving the first geofence based at least on a monitored change.

Example 2 provides a method according to any one of the preceding or proceeding systems and/or methods further comprising monitoring the choke point.

Example 3 provides a method according to any one of the preceding or proceeding systems and/or methods, wherein the monitoring includes creating a polygon at the choke point.

Example 4 provides a method according to any one of the preceding or proceeding systems and/or methods, wherein software tooling is used to perform the monitoring.

Example 5 provides a method according to any one of the preceding or proceeding systems and/or methods, wherein the polygon is highly granular.

Example 6 provides a method according to any one of the preceding or proceeding systems and/or methods further comprising monitoring the highly granular polygon at a substantially real-time rate.

Example 7 provides a method according to any one of the preceding or proceeding systems and/or methods, wherein the change includes a new avoidance area.

Example 8 provides a method according to any one of the preceding or proceeding systems and/or methods, wherein the monitored change dynamic movement of the first geofence includes excluding the avoidance area from the first geofence.

Example 9 provides a method according to any one of the preceding or proceeding systems and/or methods, wherein the monitored change dynamic movement of the first geofence includes excluding the avoidance area from the operational design domain.

Example 10 provides a method according to any one of the preceding or proceeding systems and/or methods, wherein the change removes an avoidance area already present in the avoidance area group.

Example 11 provides a method according to any one of the preceding or proceeding systems and/or methods, wherein the already dynamic movement of the first geofence includes augmenting the first geofence to include the removed avoidance area.

Example 12 provides a method according to any one of the preceding or proceeding systems and/or methods, wherein the already dynamic movement of the first geofence includes augmenting the operational design domain to include the removed avoidance area.

Example 13 provides a method according to any one of the preceding or proceeding systems and/or methods further comprising calculating a fragility to an area of the operational design domain based at least on the connectivity.

Example 14 provides a method according to any one of the preceding or proceeding systems and/or methods further comprising removing a cut off area of the operational design domain based at least on the calculated fragility.

Example 15 provides a method according to any one of the preceding or proceeding systems and/or methods further comprising instructing on or more autonomous vehicles present in a cut off area of the operational design domain to self-evict.

Example 16 provides a method according to any one of the preceding or proceeding systems and/or methods further comprising a second geofence which is comprised by the operational design domain.

Example 17 provides a method according to any one of the preceding or proceeding systems and/or methods, wherein the first and second geofences have different assigned states.

Example 18 provides a system for preventing service disruption in a fleet of autonomous vehicles comprising a monitoring circuit configured to detect changes in at least one of: avoidance areas in an avoidance area group, operational design domain, and a vehicle router configured to reconfigure one or more geofences based at least on changes detected by the monitoring circuit, wherein the operational design domain comprises the one or more geofences and excludes the avoidance areas in an avoidance area group.

Example 19 provides a method according to any one of the preceding or proceeding systems and/or methods further comprising a simulator using visual analysis.

Example 20 provides a method for preventing service disruption in an operation design domain comprising identifying a choke point in the operational design domain, monitoring the choke point for changes, and dynamically move a geofence based on the choke point changes, wherein the operational design domain comprised the geofence.

Example 21 provides a method for preventing service disruptions in an autonomous vehicle service network comprising maintaining a collection of avoidance areas, creating a first geofence associated with the service network, identifying a first low-connectivity area in the service network, adding the first low-connectivity area to the collection of avoidance areas, updating the service network, dynamically moving the first geofence based at least on changes in the collection of avoidance areas.

Example 22 provides a method according to any one of the preceding or proceeding systems and/or methods further comprising instructing on or more autonomous vehicles present in a low-connectivity area to self-evict.

Example 23 provides a method according to any one of the preceding or proceeding systems and/or methods further comprising monitoring for choke points.

Example 24 provides a method according to any one of the preceding or proceeding systems and/or methods, wherein software tooling is used to perform the monitoring.

Example 25 provides a method according to any one of the preceding or proceeding systems and/or methods further comprising identifying a second low-connectivity area in the service network and adding the second low-connectivity area to the collection of avoidance areas.

Example 26 provides a method according to any one of the preceding or proceeding systems and/or methods further comprising creating a second geofence at least on changes to the service network.

Example 27 provides a method according to any one of the preceding or proceeding systems and/or methods further comprising identifying a high-connectivity area in the service network and removing the high-connectivity area to the collection of avoidance areas.

Example 28 provides a method according to any one of the preceding or proceeding systems and/or methods further comprising dynamically moving the first geofence based at least on changes in the collection of avoidance areas.

Example 29 provides a method according to any one of the preceding or proceeding systems and/or methods, wherein the dynamic movement of the first geofence includes augmenting the first geofence.

Example 30 provides a method according to any one of the preceding or proceeding systems and/or methods further comprising updating the service network based at least on the identifying high-connectivity area.

Example 31 provides a method according to any one of the preceding or proceeding systems and/or methods further comprising identifying alternate connectivity sites.

Example 32 provides a method according to any one of the preceding or proceeding systems and/or methods further comprising providing live service area changes.

Example 33 provides a method according to any one of the preceding or proceeding systems and/or methods further comprising increasing reliance on remote assistance.

Example 34 provides a method according to any one of the preceding or proceeding systems and/or methods further comprising increasing reliance on manual drive interventions.

Example 35 provides a method according to any one of the preceding or proceeding systems and/or methods further comprising calculating a connectivity score to the low-connectivity area.

Example 36 provides a method according to any one of the preceding or proceeding systems and/or methods further comprising removing a cut off area of the service network based at least on the connectivity score.

Variations and Implementations

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for preventing service disruptions in a vehicle service network comprising:
    maintaining a collection of avoidance areas;
    creating a first geofence associated with the vehicle service network;
    identifying a first low-connectivity area in the vehicle service network;
    adding the first low-connectivity area to the collection of avoidance areas;
    updating the vehicle service network based on the collection of avoidance areas; and
    moving the first geofence based on the collection of avoidance areas.

2. The method according to claim 1, further comprising instructing one or more autonomous vehicles present in a low-connectivity area to self-evict.

3. The method according to claim 2, further comprising monitoring for choke points.

4. The method according to claim 3, wherein software tooling is used to perform the monitoring.

5. The method according to claim 1, further comprising identifying a second low-connectivity area in the vehicle service network and adding the second low-connectivity area to the collection of avoidance areas.

6. The method according to claim 1, further comprising creating a second geofence based at least on changes to the vehicle service network.

7. The method according to claim 1, further comprising identifying a high-connectivity area in the vehicle service network and removing the high-connectivity area to the collection of avoidance areas.

8. The method according to claim 7, further comprising moving the first geofence based at least on changes in the collection of avoidance areas.

9. The method according to claim 8, wherein the movement of the first geofence over time includes augmenting the first geofence.

10. The method according to claim 7, further comprising updating the vehicle service network based at least on the identifying of the high-connectivity area.

11. The method according to claim 1, further comprising identifying alternate connectivity sites.

12. The method according to claim 1, further comprising receiving live service area changes.

13. The method according to claim 1, further comprising increasing reliance on remote assistance to prevent a service disruption.

14. The method according to claim 1, further comprising increasing reliance on manual drive interventions to prevent a service disruption.

15. The method according to claim 1, further comprising calculating a connectivity score to the first low-connectivity area.

16. The method according to claim 15, further comprising removing a cut off area of the vehicle service network based at least on the connectivity score.

17. The method according to claim 16, further comprising assigning a state to the cut off area based at least on the connectivity score.

* * * * *